US012628241B2

(12) United States Patent
Wang et al.

(10) Patent No.: US 12,628,241 B2
(45) Date of Patent: May 12, 2026

(54) TERMINAL DEVICE, NETWORK NODE, AND METHODS THEREIN FOR DRX CONFIGURATION

(71) Applicant: Telefonaktiebolaget LM Ericsson (publ), Stockholm (SE)

(72) Inventors: Min Wang, Luleå (SE); Antonino Orsino, Kirkkonummi (FI); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 447 days.

(21) Appl. No.: 18/278,882

(22) PCT Filed: Feb. 22, 2022

(86) PCT No.: PCT/CN2022/077259
§ 371 (c)(1),
(2) Date: Aug. 25, 2023

(87) PCT Pub. No.: WO2022/179496
PCT Pub. Date: Sep. 1, 2022

(65) Prior Publication Data
US 2024/0064857 A1     Feb. 22, 2024

(30) Foreign Application Priority Data
Feb. 26, 2021    (WO) ................ PCT/CN2021/078250

(51) Int. Cl.
*H04W 76/28*        (2018.01)
*H04W 76/10*        (2018.01)
*H04W 92/18*        (2009.01)

(52) U.S. Cl.
CPC ........... *H04W 76/28* (2018.02); *H04W 76/10* (2018.02); *H04W 92/18* (2013.01)

(58) Field of Classification Search
CPC ..... H04W 76/28; H04W 76/10; H04W 92/18; H04W 76/23
See application file for complete search history.

(56) References Cited

U.S. PATENT DOCUMENTS

2020/0314953 A1    10/2020  Lin
2020/0328864 A1    10/2020  Chol et al.
(Continued)

FOREIGN PATENT DOCUMENTS

CN        109644460  A      4/2019
CN        111818648  A      10/2020
(Continued)

OTHER PUBLICATIONS

International Search Report and Written Opinion issued in International Application No. PCT/CN2022/077259 dated Mar. 31, 2022 (10 pages).
(Continued)

*Primary Examiner* — Ayanah S George
(74) *Attorney, Agent, or Firm* — Sage Patent Group

(57)        ABSTRACT

The present disclosure provides a method (300) in a first terminal device. The method (300) includes: transmitting (310), to a second terminal device, a first sidelink message containing a first Discontinuous Reception, DRX, configuration; receiving (320), from the second terminal device, a second sidelink message containing a second DRX configuration; and delaying (330) transmission of a second response to the second sidelink message to the second terminal device until a first response to the first sidelink message is received from the second terminal device, or until a timer expires.

20 Claims, 14 Drawing Sheets

(56) References Cited

U.S. PATENT DOCUMENTS

2020/0351964 A1    11/2020  Wu et al.
2021/0059005 A1*    2/2021  Hosseini ............... H04W 76/28
2021/0306948 A1*    9/2021  Ding ................. H04W 52/0235
2022/0030602 A1     1/2022  Yang

FOREIGN PATENT DOCUMENTS

CN         112020892  A    12/2020
WO      2020/222595  A1    11/2020

OTHER PUBLICATIONS

LG Electronics, "WID revision: NR sidelink enhancement", 3GPP
TSG RAN Meeting #88e, RP-201385, Electronic Meeting, Jun.
29-Jul. 3, 2020 (revision of RP-201283) (6 pages).
3GPP TS 38.213 V16.4.0 (Dec. 2020), 3rd Generation Partnership
Project; Technical Specification Group Radio Access Network; NR;
Physical layer procedure for control (Release 16), Dec. 2020 (181
pages).
3GPP TS 38.214 V16.4.0 (Dec. 2020), 3rd Generation Partnership
Project; Technical Specification Group Radio Access Network; NR;
Physical layer procedures for data (Release 16), Dec. 2020 (169
pages).
3GPP TS 38.321 V16.3.0 (Dec. 2020), 3rd Generation Partnership
Project; Technical Specification Group Radio Access Network; NR;
Medium Access Control (MAC) protocol specification (Release 16),
Dec. 2020 (156 pages).

* cited by examiner

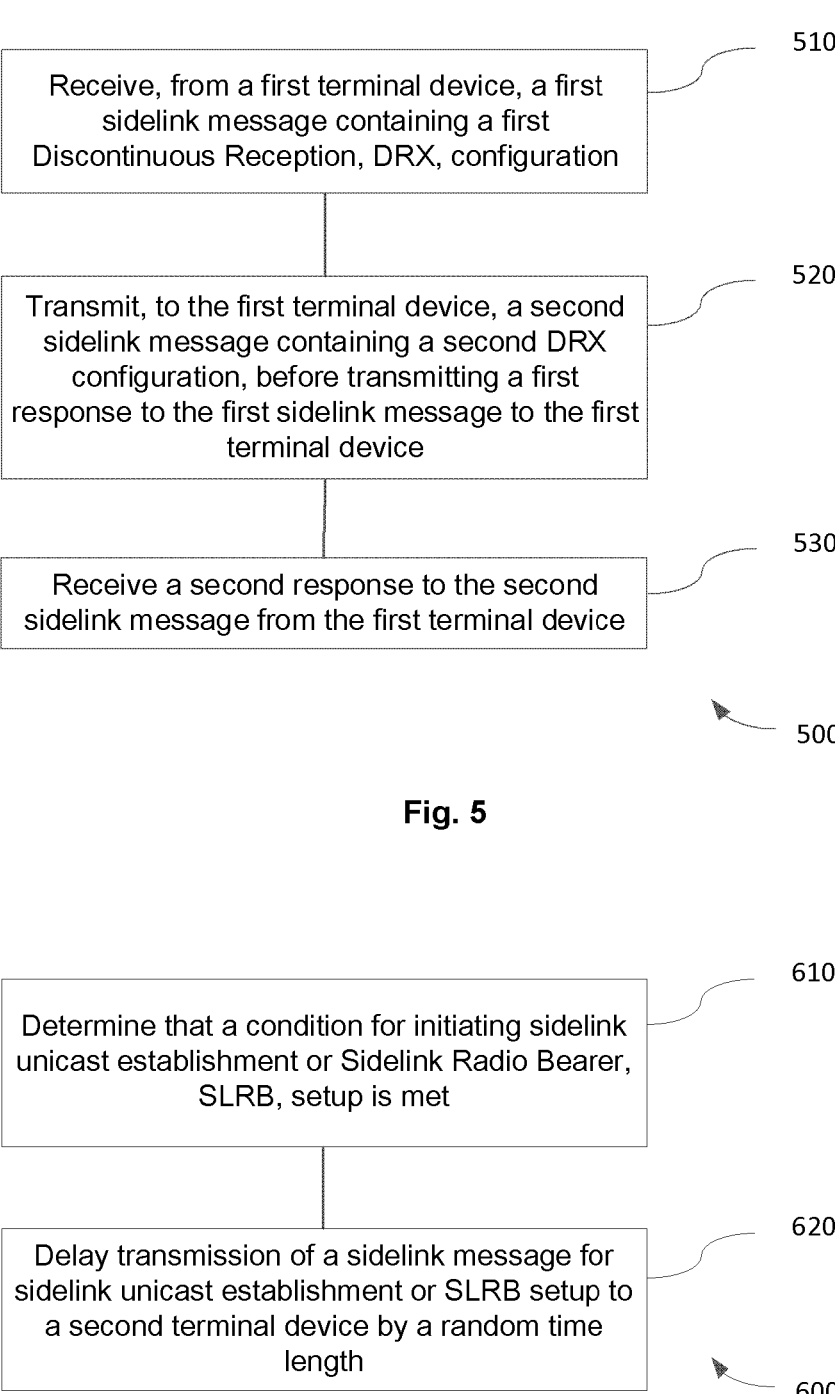

510

Receive, from a first terminal device, a first sidelink message containing a first Discontinuous Reception, DRX, configuration

520

Transmit, to the first terminal device, a second sidelink message containing a second DRX configuration, before transmitting a first response to the first sidelink message to the first terminal device

530

Receive a second response to the second sidelink message from the first terminal device

Determine that a condition for initiating sidelink unicast establishment or Sidelink Radio Bearer, SLRB, setup is met

620

Delay transmission of a sidelink message for sidelink unicast establishment or SLRB setup to a second terminal device by a random time length

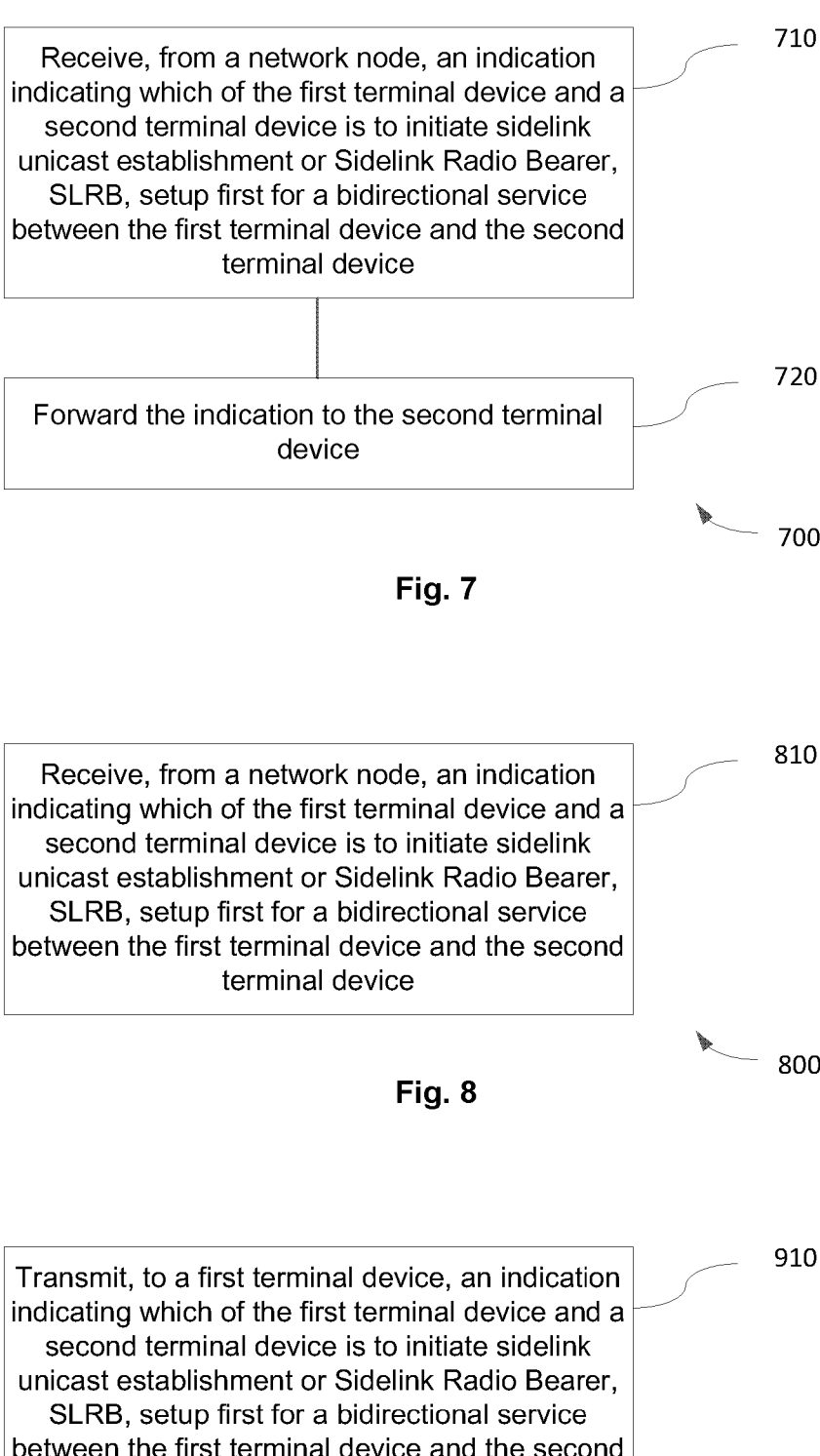

710

Receive, from a network node, an indication indicating which of the first terminal device and a second terminal device is to initiate sidelink unicast establishment or Sidelink Radio Bearer, SLRB, setup first for a bidirectional service between the first terminal device and the second terminal device

720

Forward the indication to the second terminal device

Receive, from a network node, an indication indicating which of the first terminal device and a second terminal device is to initiate sidelink unicast establishment or Sidelink Radio Bearer, SLRB, setup first for a bidirectional service between the first terminal device and the second terminal device

Transmit, to a first terminal device, an indication indicating which of the first terminal device and a second terminal device is to initiate sidelink unicast establishment or Sidelink Radio Bearer, SLRB, setup first for a bidirectional service between the first terminal device and the second terminal device

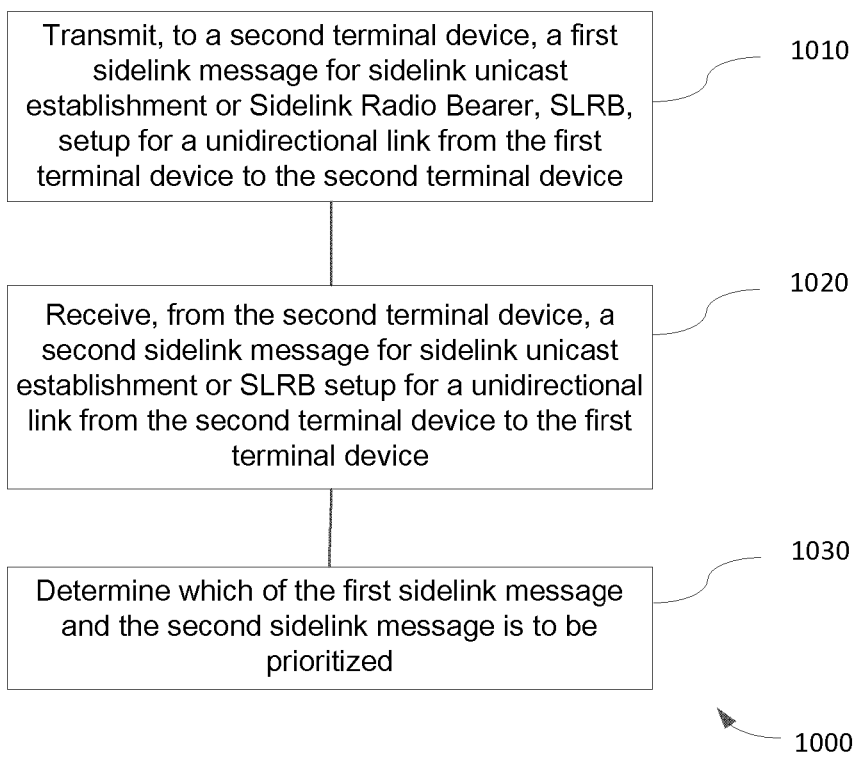

Transmit, to a second terminal device, a first sidelink message for sidelink unicast establishment or Sidelink Radio Bearer, SLRB, setup for a unidirectional link from the first terminal device to the second terminal device — 1010

Receive, from the second terminal device, a second sidelink message for sidelink unicast establishment or SLRB setup for a unidirectional link from the second terminal device to the first terminal device — 1020

Determine which of the first sidelink message and the second sidelink message is to be prioritized — 1030

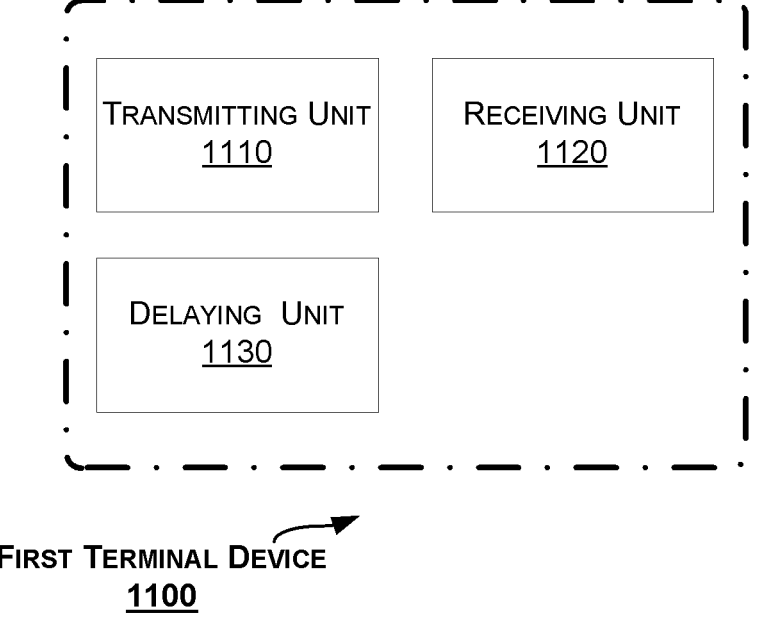

TRANSMITTING UNIT
1110

RECEIVING UNIT
1120

DELAYING UNIT
1130

FIRST TERMINAL DEVICE
1100

Fig. 11

FIRST TERMINAL DEVICE
1200

SECOND TERMINAL DEVICE
1300

FIRST TERMINAL DEVICE
1400

FIRST TERMINAL DEVICE
1500

SECOND TERMINAL DEVICE
1600

NETWORK NODE
1700

FIRST TERMINAL DEVICE
1800

FIRST TERMINAL DEVICE
1900

SECOND TERMINAL DEVICE
2000

NETWORK NODE
2100

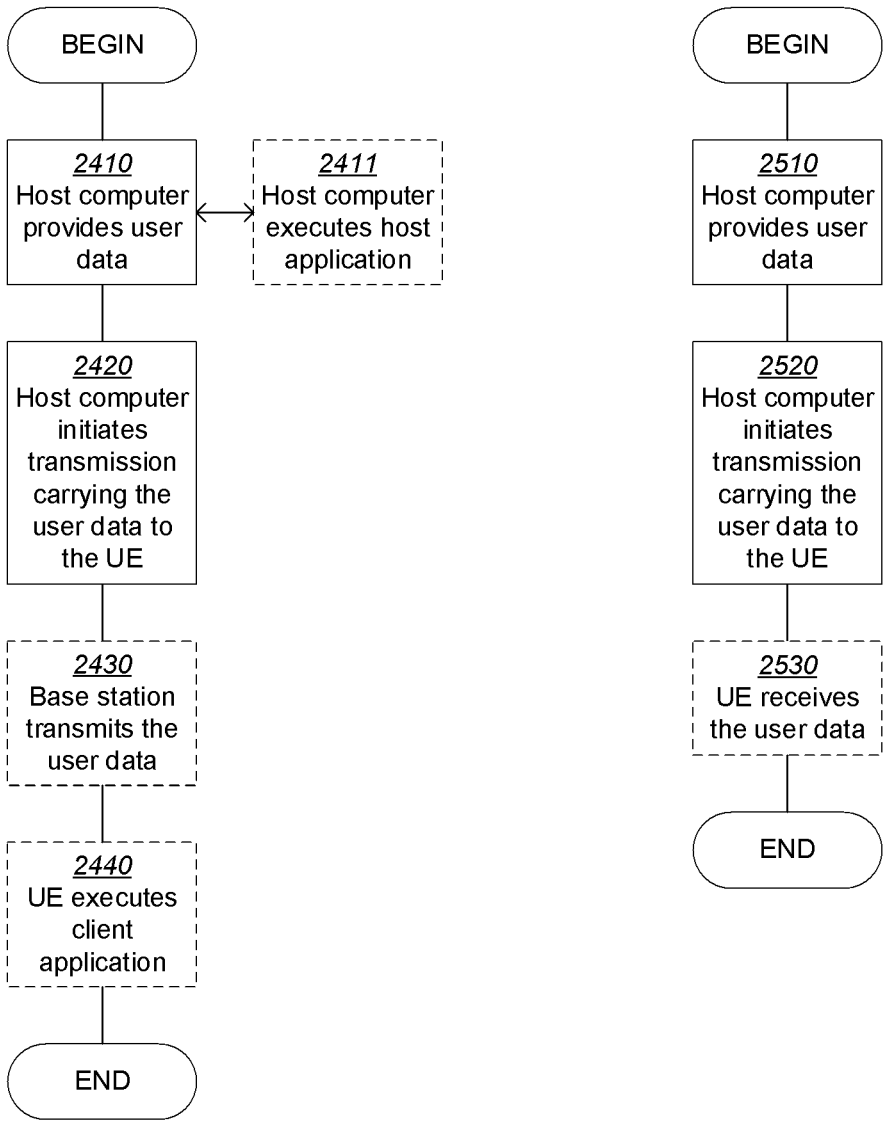
FIG. 24                              FIG. 25

TERMINAL DEVICE, NETWORK NODE, AND METHODS THEREIN FOR DRX CONFIGURATION

CROSS REFERENCE TO RELATED APPLICATIONS

This application is a 35 U.S.C. § 371 National Stage of International Patent Application No. PCT/CN2022/077259, filed 2022 Feb. 22, which claims priority to International Patent Application No. PCT/CN2021/078250, filed on 2021 Feb. 26, which is incorporated by this reference.

TECHNICAL FIELD

The present disclosure relates to communication technology, and more particularly, to a terminal device, a network node, and methods therein for Discontinuous Reception (DRX) configuration.

BACKGROUND

Sidelink (SL) transmissions over New Radio (NR) are specified in the 3$^{rd}$ Generation Partnership Project (3GPP) in Release 16, including enhancements of Proximity-based Services (ProSe) specified for Long Term Evolution (LTE). Four new enhancements are particularly introduced to NR sidelink transmissions as follows:

Support for unicast and groupcast transmissions is added in NR sidelink. For unicast and groupcast, a Physical Sidelink Feedback Channel (PSFCH) is introduced for a receiver User Equipment (UE) to reply a decoding status to a transmitter UE.

Grant-free transmissions, which are adopted in NR uplink transmissions, are also provided in NR sidelink transmissions, to improve the latency performance.

To alleviate resource collisions among different sidelink transmissions launched by different UEs, it enhances channel sensing and resource selection procedures, which also leads to a new design of Physical Sidelink Common Control Channel (PSCCH).

To achieve a high connection density, congestion control and thus Quality of Service (QoS) management are supported in NR sidelink transmissions.

To enable the above enhancements, new physical channels and reference signals are introduced in NR:

Physical Sidelink Shared Channel (PSSCH), a sidelink version of Physical Downlink Shared Channel (PDSCH): The PSSCH is transmitted by a sidelink transmitter UE, and conveys sidelink transmission data, System Information Blocks (SIBs) for Radio Resource Control (RRC) configuration, and a part of Sidelink Control Information (SCI), a sidelink version of Downlink Control Information (DCI).

PSFCH, a sidelink version of Physical Uplink Control Channel (PUCCH): The PSFCH is transmitted by a sidelink receiver UE for unicast and groupcast, and conveys 1 bit information over 1 Resource Block (RB) for a Hybrid Automatic Repeat reQeust (HARQ) acknowledgement (ACK) or a negative ACK (NACK). In addition, Channel State Information (CSI) is carried in a Medium Access Control (MAC) Control Element (CE) over the PSSCH instead of the PSFCH.

PSCCH, a sidelink version of Physical Downlink Control Channel (PDCCH): When traffic to be sent to a receiver UE arrives at a transmitter UE, the transmitter UE should first send the PSCCH, which conveys a part of SCI to be decoded by any UE for the channel sensing purpose, including reserved time-frequency resources for transmissions, DeModulation Reference Signal (DMRS) pattern, and antenna port, etc.

Sidelink Primary/Secondary Synchronization Signal (S-PSS/S-SSS): Similar to downlink transmissions in NR, in sidelink transmissions, S-PSS and S-SSS are supported. Through detecting the S-PSS and S-SSS, a UE is able to identify a Sidelink Synchronization Identity (SSID) from the UE sending the S-PSS/S-SSS. The UE is therefore able to know the characteristics of the transmitter UE from the S-PSS/S-SSS. A series of processes of acquiring timing and frequency synchronization together with SSIDs of UEs is called initial cell search. Note that the UE sending the S-PSS/S-SSS may not be necessarily involved in sidelink transmissions, and a node (e.g., UE, evolved NodeB (eNB), or (next) generation NodeB (gNB)) sending the S-PSS/S-SSS is called a synchronization source. There are 2 S-PSS sequences and 336 S-SSS sequences forming a total of 672 SSIDs in a cell.

Physical Sidelink Broadcast Channel (PSBCH): The PSBCH is transmitted along with the S-PSS/S-SSS as a Synchronization Signal/PSBCH Block (SSB). The SSB has the same numerology as PSCCH/PSSCH on the carrier, and an SSB should be transmitted within the bandwidth of the configured BWP. The PSBCH conveys information related to synchronization, such as the Direct Frame Number (DFN), an indication of the slot and symbol level time resources for sidelink transmissions, an in-coverage indicator, etc. The SSB is transmitted periodically at every 160 ms.

DMRS, Phase Tracking Reference Signal (PT-RS), Channel State Information Reference Signal (CSI-RS): These physical reference signals supported by NR downlink/uplink transmissions are also adopted by sidelink transmissions. Similarly, the PT-RS is only applicable for Frequency Range 2 (FR2) transmission.

Another new feature is the two-stage SCI. Unlike the DCI, only part (first stage) of the SCI is sent on the PSCCH. This part is used for channel sensing purposes (including reserved time-frequency resources for transmissions, DMRS pattern, and antenna port, etc.) and can be read by all UEs, while the remaining (second stage) scheduling and control information, such as a 8-bit source identity (ID) and a 16-bit destination ID, a New Data Indicator (NDI), a Redundancy Version (RV), and a HARQ process ID, is sent on the PSSCH to be decoded by the receiver UE.

SUMMARY

UE energy saving is one important performance indicator. There is no energy saving feature defined for sidelink until 3GPP Release 16. In the 3GPP Release 17 Work Item (WI) on NR sidelink enhancement, RP-201385, "WID revision: NR sidelink enhancement", the below objectives on UE Sidelink energy saving have been agreed and will be studied in the 3GPP Release 17 time frame:

Sidelink DRX for broadcast, groupcast, and unicast [RAN2]:

1) Define on- and off-durations in sidelink and specify the corresponding UE procedure.

2) Specify mechanism aiming to align sidelink DRX wake-up time among the UEs communicating with each other.

3) Specify mechanism aiming to align sidelink DRX wake-up time with Uu DRX wake-up time in an in-coverage UE.

From the above study objectives, DRX mechanisms for sidelink will be designed and specified in the 3GPP Release 17. From the second objective, how to align sidelink DRX active time among UEs is one important aspect.

In RAN2 #113-e, RAN2 has made the following agreement:

For unicast, for out-of-coverage (OOC) scenario, adopt per-direction DRX configuration is as baseline. FFS on whether it is transmitter (Tx)-centric or receiver (Rx)-centric, i.e., Tx UE or Rx UE decides it.

From the above agreement, RAN2 has agreed to base on per-direction DRX configuration. In other words, for a service/application containing bidirectional transmissions, there will be two DRX configurations configured, with each configuration serving one direction. Meanwhile, RAN2 will further study if it is feasible a common DRX configuration can be applied for the same service irrespective of transmission directions.

For a pair of UEs (e.g., UE1 and UE2), in order to achieve power saving, it is desired that both UEs have aligned sidelink DRX configurations. However, there may be a race condition observed during the alignment procedure which involves both UEs.

In a first case, both UEs apply a common DRX configuration for a same service. Both UEs may initiate the alignment procedure in parallel or within a relatively short time interval. It would be unclear the eventual alignment between the UEs shall rely on which procedure (i.e., UE1-initiated procedure or UE2-initiated procedure).

In a second case, both UEs apply directional DRX configurations for a same service. Both directional configurations need to be aligned as much as possible. In cases without a race condition, either UE1 or UE2 may first initiate transmissions, and a first sidelink DRX configuration for one particular direction will be first established. After a while, a second sidelink DRX configuration for the reverse direction can be established for data transmission. The second sidelink DRX configuration may take the first sidelink DRX configuration into consideration such that alignment between the two configurations can be achieved. However, both UEs may initiate an alignment procedure in parallel or within a relatively short time interval. It would be unclear the eventual alignment between the UEs shall rely on which procedure (i.e., UE1-initiated procedure or UE2-initiated procedure).

It is an object of the present disclosure to provide a terminal device, a network node, and methods therein, capable of addressing the above race condition, so as to achieve aligned sidelink DRX configurations between UEs.

According to a first aspect of the present disclosure, a method in a first terminal device is provided. The method includes: transmitting, to a second terminal device, a first sidelink message containing a first DRX configuration; receiving, from the second terminal device, a second sidelink message containing a second DRX configuration; and delaying transmission of a second response to the second sidelink message to the second terminal device until a first response to the first sidelink message is received from the second terminal device, or until a timer expires.

In an embodiment, the first response may contain a suggested change to the first DRX configuration, and the method may further include: updating the first DRX configuration based on the suggested change to the first DRX configuration.

In an embodiment, the updated first DRX configuration and the second DRX configuration may contain respective on-duration timers and/or inactivity timers that are configured separately, and one or more DRX parameters that are configured to be common to the updated first DRX configuration and the second DRX configuration.

In an embodiment, the one or more DRX parameters may include a slot offset, a retransmission timer, a long cycle start offset, a short cycle, a short cycle timer, and/or a Hybrid Automatic Repeat request (HARQ) Round-Trip Time (RTT) timer.

In an embodiment, the method may further include: transmitting the second response to the second terminal device, the second response containing a suggested change to the second DRX configuration.

In an embodiment, the suggested change to the second DRX configuration may be determined based on the updated first DRX configuration.

In an embodiment, the timer may be set to a different value from a corresponding timer provided at the second terminal device.

In an embodiment, each of the first DRX configuration and the second DRX configuration may be for a bidirectional link between the first terminal device and the second terminal device, or the first DRX configuration may be for a unidirectional link from the first terminal device to the second terminal device, and the second DRX configuration is for a unidirectional link from the second terminal device to the first terminal device.

In an embodiment, the first sidelink message may be for sidelink unicast establishment or Sidelink Radio Bearer (SLRB) setup for a unidirectional link from the first terminal device to the second terminal device, and the second sidelink message may be for sidelink unicast establishment or SLRB setup for a unidirectional link from the second terminal device to the first terminal device.

In an embodiment, the first sidelink message and the second sidelink message may be associated with a same type of service or with different types of services.

In an embodiment, the first sidelink message and/or the second response may be transmitted, and/or the second sidelink message and/or the first response may be received, via: PC5-Radio Resource Control (RRC) signaling, PC5-Signaling (PC5-S) discovery signaling, Medium Access Control (MAC) Control Element (CE), or Layer 1 (L1), signaling.

In an embodiment, the method may further include: receiving, from a network node or another terminal device controlling the first terminal device and/or the second terminal device, a configuration for the delaying.

In an embodiment, the network node may be a next generation Node B (gNB), a Session Management Function (SMF) node, or a Policy Control Function (PCF) node.

In an embodiment, the configuration may be received from the gNB via: RRC signaling, MAC CE or L1 signaling; the configuration may be received from the SMF node or the PCF node via: Non-Access Stratum (NAS) RRC signaling; or the configuration may be received from the other terminal device via: PC5-RRC signaling, PC5-S discovery signaling, MAC CE, or L1 signaling.

According to a second aspect of the present disclosure, a first terminal device is provided. The first terminal device includes a transmitting unit configured to transmit, to a second terminal device, a first sidelink message containing a first DRX configuration. The first terminal device further includes a receiving unit configured to receive, from the second terminal device, a second sidelink message containing a second DRX configuration. The first terminal device further includes a delaying unit configured to delay transmission of a second response to the second sidelink message to the second terminal device until a first response to the first sidelink message is received from the second terminal device, or until a timer expires.

According to a third aspect of the present disclosure, a first terminal device is provided. The first terminal device includes a transceiver, a processor and a memory. The memory contains instructions executable by the processor whereby the first terminal device is operative to perform the method according to the above first aspect.

According to a fourth aspect of the present disclosure, a computer readable storage medium is provided. The computer readable storage medium has computer program instructions stored thereon. The computer program instructions, when executed by a processor in a first terminal device, cause the first terminal device to perform the method according to the above first aspect.

According to a fifth aspect of the present disclosure, a method in a first terminal device is provided. The method includes: transmitting, to a second terminal device, a first sidelink message containing a first DRX configuration; receiving, from the second terminal device, a second sidelink message containing a second DRX configuration; and transmitting a second response to the second sidelink message to the second terminal device without waiting for a first response to the first sidelink message from the second terminal device.

In an embodiment, the second response may contain an Acknowledgement (ACK) or success information indicating that the second DRX configuration is applicable to the first terminal device, or a Negative Acknowledgement (NACK) or failure information indicating that the second DRX configuration is not applicable to the first terminal device.

In an embodiment, the second response may further contain a suggested change to the second DRX configuration.

In an embodiment, the suggested change to the second DRX configuration may be determined based on the first DRX configuration.

In an embodiment, the second response may be a failure response.

In an embodiment, the second response may contain a failure cause associated with a race condition in DRX configuration negotiation between the first terminal device and the second terminal device, or with a misalignment between the first DRX configuration and the second DRX configuration.

In an embodiment, the method may further include: receiving the first response from the second terminal device; receiving a third sidelink message from the second terminal device, as a result of failure of the second sidelink message; and transmitting a third response to the third sidelink message to the second terminal device.

In an embodiment, the second response may further contain an indication of expected time at which the second terminal device is to transmit the third sidelink message.

In an embodiment, each of the first DRX configuration and the second DRX configuration may be for a bidirectional link between the first terminal device and the second terminal device, or the first DRX configuration may be for a unidirectional link from the first terminal device to the second terminal device and the second DRX configuration is for a unidirectional link from the second terminal device to the first terminal device.

In an embodiment, the first sidelink message may be for sidelink unicast establishment or SLRB setup for a unidirectional link from the first terminal device to the second terminal device, and the second sidelink message may be for sidelink unicast establishment or SLRB setup for a unidirectional link from the second terminal device to the first terminal device.

In an embodiment, the first sidelink message and the second sidelink message may be associated with a same type of service or with different types of services.

In an embodiment, the first sidelink message and/or the second response may be transmitted, and/or the second sidelink message and/or the first response may be received, via: PC5-RRC signaling, PC5-S discovery signaling, MAC CE or L1 signaling.

In an embodiment, the method may further include: receiving, from a network node or another terminal device controlling the first terminal device and/or the second terminal device, a configuration for transmitting the second response without waiting for the first response.

In an embodiment, the network node may be a gNB a SMF node, or a PCF node.

In an embodiment, the configuration may be received from the gNB via: RRC signaling, MAC CE or L1 signaling; the configuration may be received from the SMF node or the PCF node via: NAS RRC signaling; or the configuration may be received from the other terminal device via: PC5-RRC signaling, PC5-S discovery signaling, MAC CE, or L1 signaling.

According to a sixth aspect of the present disclosure, a first terminal device is provided. The first terminal device includes a transmitting unit configured to transmit, to a second terminal device, a first sidelink message containing a first DRX configuration. The transmitting unit is further configured to transmit a second response to the second sidelink message to the second terminal device without waiting for a first response to the first sidelink message from the second terminal device. The first terminal device further includes a receiving unit configured to receive, from the second terminal device, a second sidelink message containing a second DRX configuration.

According to a seventh aspect of the present disclosure, a first terminal device is provided. The first terminal device includes a transceiver, a processor and a memory. The memory contains instructions executable by the processor whereby the first terminal device is operative to perform the method according to the above fifth aspect.

According to an eighth aspect of the present disclosure, a computer readable storage medium is provided. The computer readable storage medium has computer program instructions stored thereon. The computer program instructions, when executed by a processor in a first terminal device, cause the first terminal device to perform the method according to the above fifth aspect.

According to a ninth aspect of the present disclosure, a method in a second terminal device is provided. The method includes: receiving, from a first terminal device, a first sidelink message containing a first DRX configuration; transmitting, to the first terminal device, a second sidelink message containing a second DRX configuration, before transmitting a first response to the first sidelink message to the first terminal device; and receiving a second response to the second sidelink message from the first terminal device.

In an embodiment, the second response may contain an Acknowledgement (ACK) or success information indicating that the second DRX configuration is applicable to the first terminal device, or a NACK or failure information indicating that the second DRX configuration is not applicable to the first terminal device.

In an embodiment, the second response may further contain a suggested change to the second DRX configuration.

In an embodiment, the suggested change to the second DRX configuration may be determined based on the first DRX configuration.

In an embodiment, the second response may be a failure response.

In an embodiment, the second response may contain a failure cause associated with a race condition in DRX configuration negotiation between the first terminal device and the second terminal device, or with a misalignment between the first DRX configuration and the second DRX configuration.

In an embodiment, the method may further include: transmitting the first response to the first terminal device; transmitting a third sidelink message to the first terminal device, as a result of failure of the second sidelink message; and receiving a third response to the third sidelink message from the first terminal device.

In an embodiment, the second response may further contain an indication of expected time at which the second terminal device is to transmit the third sidelink message.

In an embodiment, each of the first DRX configuration and the second DRX configuration may be for a bidirectional link between the first terminal device and the second terminal device, or the first DRX configuration may be for a unidirectional link from the first terminal device to the second terminal device and the second DRX configuration is for a unidirectional link from the second terminal device to the first terminal device.

In an embodiment, the first sidelink message may be for sidelink unicast establishment or SLRB setup for a unidirectional link from the first terminal device to the second terminal device, and the second sidelink message may be for sidelink unicast establishment or SLRB setup for a unidirectional link from the second terminal device to the first terminal device.

In an embodiment, the first sidelink message and the second sidelink message may be associated with a same type of service or with different types of services.

In an embodiment, the first sidelink message and/or the second response may be received, and/or the second sidelink message and/or the first response may be transmitted via: PC5-RRC signaling, PC5-S discovery signaling, MAC CE or L1 signaling.

According to a tenth aspect of the present disclosure, a second terminal device is provided. The second terminal device includes a receiving unit configured to receiving, from a first terminal device, a first sidelink message containing a first DRX configuration. The receiving unit is further configured to receive a second response to the second sidelink message from the first terminal device. The second terminal device further include a transmitting unit configured to transmit, to the first terminal device, a second sidelink message containing a second DRX configuration, before transmitting a first response to the first sidelink message to the first terminal device.

According to an eleventh aspect of the present disclosure, a second terminal device is provided. The second terminal device includes a transceiver, a processor and a memory. The memory contains instructions executable by the processor whereby the second terminal device is operative to perform the method according to the above ninth aspect.

According to a twelfth aspect of the present disclosure, a computer readable storage medium is provided. The computer readable storage medium has computer program instructions stored thereon. The computer program instructions, when executed by a processor in a second terminal device, cause the second terminal device to perform the method according to the above ninth aspect.

According to a thirteenth aspect of the present disclosure, a method in a first terminal device is provided. The method includes: determining that a condition for initiating sidelink unicast establishment or SLRB setup is met; and delaying transmission of a sidelink message for sidelink unicast establishment or SLRB setup to a second terminal device by a random time length.

In an embodiment, the condition may include traffic or data being available for transmission to the second terminal device.

In an embodiment, the random time length may follow a random variable distribution.

In an embodiment, the sidelink message may be transmitted via: PC5-RRC signaling, PC5-S discovery signaling, MAC CE or L1 signaling.

According to a fourteenth aspect of the present disclosure, a first terminal device is provided. The first terminal device includes a determining unit configured to determine that a condition for initiating sidelink unicast establishment or SLRB setup is met. The first terminal device further includes a delaying unit configured to delay transmission of a sidelink message for sidelink unicast establishment or SLRB setup to a second terminal device by a random time length.

According to a fifteenth aspect of the present disclosure, a first terminal device is provided. The first terminal device includes a transceiver, a processor and a memory. The memory contains instructions executable by the processor whereby the first terminal device is operative to perform the method according to the above thirteenth aspect.

According to a sixteenth aspect of the present disclosure, a computer readable storage medium is provided. The computer readable storage medium has computer program instructions stored thereon. The computer program instructions, when executed by a processor in a first terminal device, cause the first terminal device to perform the method according to the above thirteenth aspect.

According to a seventeenth aspect of the present disclosure, a method in a first terminal device is provided. The method includes: receiving, from a network node, an indication indicating which of the first terminal device and a second terminal device is to initiate sidelink unicast establishment or SLRB setup first for a bidirectional service between the first terminal device and the second terminal device; and forwarding the indication to the second terminal device.

In an embodiment, the method may further include, when the indication indicates that the first terminal device is to initiate the sidelink unicast establishment or SLRB setup first: transmitting, to the second terminal device, a sidelink message for sidelink unicast establishment or SLRB setup for a unidirectional link from the first terminal device to the second terminal device.

In an embodiment, the method may further include, when the indication indicates that the second terminal device is to initiate the sidelink unicast establishment or SLRB setup first: transmitting, to the second terminal device, a sidelink message for sidelink unicast establishment or SLRB setup for a unidirectional link from the first terminal device to the second terminal device, after a unidirectional link from the second terminal device to the first terminal device has been established.

In an embodiment, the network node may be a gNB a SMF node, or a PCF node.

In an embodiment, the indication may be received from the gNB via: RRC signaling, MAC CE or L1 signaling; the indication may be received from the SMF node or the PCF node via: NAS RRC signaling; or the indication may be forwarded to the second terminal device via: PC5-RRC signaling, PC5-S discovery signaling, MAC CE, or L1 signaling.

According to an eighteenth aspect of the present disclosure, a first terminal device is provided. The first terminal device includes a receiving unit configured to receive, from a network node, an indication indicating which of the first terminal device and a second terminal device is to initiate sidelink unicast establishment or SLRB setup first for a bidirectional service between the first terminal device and the second terminal device. The first terminal device further include a forwarding unit configured to forward the indication to the second terminal device.

According to a nineteenth aspect of the present disclosure, a first terminal device is provided. The first terminal device includes a transceiver, a processor and a memory, the memory including instructions executable by the processor whereby the first terminal device is operative to perform the method according to the above seventeenth aspect.

According to a twentieth aspect of the present disclosure, a computer readable storage medium is provided. The computer readable storage medium has computer program instructions stored thereon. The computer program instructions, when executed by a processor in a first terminal device, cause the first terminal device to perform the method according to the above seventeenth aspect.

According to a twenty-first aspect of the present disclosure, a method in a second terminal device is provided. The method includes: receiving, from a first terminal device, an indication indicating which of the first terminal device and the second terminal device is to initiate sidelink unicast establishment or SLRB setup first for a bidirectional service between the first terminal device and the second terminal device.

In an embodiment, the method may further include, when the indication indicates that the second terminal device is to initiate the sidelink unicast establishment or SLRB setup first: transmitting, to the first terminal device, a sidelink message for sidelink unicast establishment or SLRB setup for a unidirectional link from the second terminal device to the first terminal device.

In an embodiment, the method may further include, when the indication indicates that the first terminal device is to initiate the sidelink unicast establishment or SLRB setup first: transmitting, to the first terminal device, a sidelink message for sidelink unicast establishment or SLRB setup for a unidirectional link from the second terminal device to the first terminal device, after a unidirectional link from the first terminal device to the second terminal device has been established.

In an embodiment, indication may be received via: PC5-RRC signaling, PC5-S discovery signaling, MAC CE or L1 signaling.

According to a twenty-second aspect of the present disclosure, a second terminal device is provided. The second terminal device includes a receiving unit configured to receive, from a first terminal device, an indication indicating which of the first terminal device and the second terminal device is to initiate sidelink unicast establishment or SLRB setup first for a bidirectional service between the first terminal device and the second terminal device.

According to a twenty-third aspect of the present disclosure, a second terminal device is provided. The second terminal device includes a transceiver, a processor and a memory. The memory contains instructions executable by the processor whereby the second terminal device is operative to perform the method according to the above twenty-first aspect.

According to a twenty-fourth aspect of the present disclosure, a computer readable storage medium is provided. The computer readable storage medium has computer program instructions stored thereon. The computer program instructions, when executed by a processor in a second terminal device, cause the second terminal device to perform the method according to the above twenty-first aspect.

According to a twenty-fifth aspect of the present disclosure, a method in a network node is provided. The method includes: transmitting, to a first terminal device, an indication indicating which of the first terminal device and a second terminal device is to initiate sidelink unicast establishment or SLRB setup first for a bidirectional service between the first terminal device and the second terminal device.

In an embodiment, the network node may be a gNB a SMF node, or a PCF node.

In an embodiment, when the network node is the gNB, the configuration may be transmitted via: RRC signaling, MAC CE or L1 signaling; or when the network node is the SMF node or the PCF node, the configuration may be transmitted via: NAS RRC signaling.

According to a twenty-sixth aspect of the present disclosure, a network node is provided. The network node includes a transmitting unit configured to transmit, to a first terminal device, an indication indicating which of the first terminal device and a second terminal device is to initiate sidelink unicast establishment or SLRB setup first for a bidirectional service between the first terminal device and the second terminal device.

According to a twenty-seventh aspect of the present disclosure, a network node is provided. The network node includes a communication interface, a processor and a memory. The memory includes instructions executable by the processor whereby the network node is operative to perform the method according to the above twenty-fifth aspect.

According to a twenty-eighth aspect of the present disclosure, a computer readable storage medium is provided. The computer readable storage medium has computer program instructions stored thereon. The computer program instructions, when executed by a processor in a network node, causing the network node to perform the method according to the above twenty-fifth aspect.

According to a twenty-ninth aspect of the present disclosure, a method in a first terminal device is provided. The method includes: transmitting, to a second terminal device, a first sidelink message for sidelink unicast establishment or SLRB setup for a unidirectional link from the first terminal device to the second terminal device; receiving, from the second terminal device, a second sidelink message for sidelink unicast establishment or SLRB setup for a unidirectional link from the second terminal device to the first terminal device; and determining which of the first sidelink message and the second sidelink message is to be prioritized.

In an embodiment, the first sidelink message may contain a first timestamp and the second sidelink message contains a second timestamp, and said determining may include determining to prioritize the first sidelink message when the first timestamp is earlier than the second timestamp, or to prioritize the second sidelink message when the second timestamp is earlier than the first timestamp.

In an embodiment, said determining may include determining to prioritize the first sidelink message or the second sidelink message based on a first weight or priority associated with the first terminal device and a second weight or priority associated with the second terminal device.

In an embodiment, the first weight or priority may be a first fixed value configured for the first terminal device, and the second weight or priority may be a second fixed value configured for the second terminal device.

In an embodiment, the first fixed value may be a User Equipment (UE) ID of the first terminal device, and the second fixed value may be a UE ID of the second terminal device.

In an embodiment, the first weight or priority or the second weight or priority may be dependent on one or more of the following associated with the first or second terminal device: a UE category, a UE capability, a battery life, a type of a current service, a priority of the current service, a Quality of Service, QoS, requirement for the current service, or a geographical location.

In an embodiment, the first sidelink message may be transmitted, and/or the second sidelink message may be received via: PC5-RRC signaling, PC5-S discovery signaling, MAC CE or L1 signaling.

According to a thirtieth aspect of the present disclosure, a first terminal device is provided. The first terminal device includes a transmitting unit configured to transmit, to a second terminal device, a first sidelink message for sidelink unicast establishment or SLRB setup for a unidirectional link from the first terminal device to the second terminal device. The first terminal device further include a receiving unit configured to receive, from the second terminal device, a second sidelink message for sidelink unicast establishment or SLRB setup for a unidirectional link from the second terminal device to the first terminal device. The first terminal device further include a determining unit configured to determine which of the first sidelink message and the second sidelink message is to be prioritized.

According to a thirty-first aspect of the present disclosure, a first terminal device is provided. The first terminal device includes a transceiver, a processor and a memory. The memory includes instructions executable by the processor whereby the first terminal device is operative to perform the method according to the above twenty-ninth aspect.

According to a thirty-second aspect of the present disclosure, a computer readable storage medium is provided. The computer readable storage medium has computer program instructions stored thereon. The computer program instructions, when executed by a processor in a first terminal device, causes the first terminal device to perform the method according to the above twenty-ninth aspect.

According to some embodiments of the present disclosure, when a race condition occurs in a negotiation procedure for sidelink DRX configurations, e.g., when a first terminal device initiates a first sidelink DRX configuration negotiation towards a second terminal device, but receives a second sidelink DRX configuration negotiation initiated by the second terminal device before receiving a first response to the first sidelink DRX configuration negotiation, the first terminal device can delay transmission of a second response to the second sidelink DRX configuration negotiation until the first response is received. According to some other embodiments of the present disclosure, mechanisms are provided to avoid such race condition in sidelink DRX configuration negotiation. In this way, the race condition in sidelink DRX configuration negotiation can be solved or avoided, such that sidelink DRX configurations can be aligned between terminal devices.

BRIEF DESCRIPTION OF THE DRAWINGS

The above and other objects, features and advantages will be more apparent from the following description of embodiments with reference to the figures, in which:

FIG. 5 is a flowchart illustrating a method in a second terminal device according to an embodiment of the present disclosure;

FIG. 6 is a flowchart illustrating a method in a first terminal device according to yet another embodiment of the present disclosure;

FIG. 7 is a flowchart illustrating a method in a first terminal device according to still another embodiment of the present disclosure;

FIG. 8 is a flowchart illustrating a method in a second terminal device according to another embodiment of the present disclosure;

FIG. 9 is a flowchart illustrating a method in a network node according to an embodiment of the present disclosure;

FIG. 10 is a flowchart illustrating a method in a first terminal device according to still yet another embodiment of the present disclosure;

FIG. 11 is a block diagram of a first terminal device according to an embodiment of the present disclosure;

FIGS. 24 to 27 are flowcharts illustrating methods implemented in a communication system including a host computer, a base station and a user equipment.

DETAILED DESCRIPTION

Figure 1:
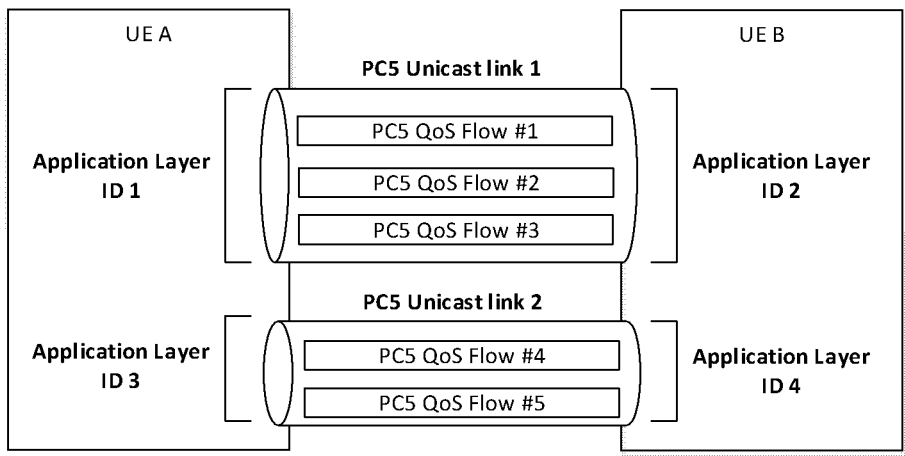
FIG. 1 is a schematic diagram showing NR sidelink unicast links between UEs.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network node in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network node" or "network device" refers to a device in a wireless communication network via which a terminal device accesses the network and receives services therefrom. The network node or network device refers to a base station (BS), an access point (AP), or any other suitable device in the wireless communication network. The BS may be, for example, a node B (NodeB or NB), an evolved NodeB (eNodeB or eNB), or a (next) generation (gNB), a Remote Radio Unit (RRU), a radio header (RH), a remote radio head (RRH), a relay, a low power node such as a femto, a pico, and so forth. Yet further examples of the network node may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network node may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from the network node to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As described in clause 5.7 of the 3rd Generation Partnership Project (3GPP) Technical Specification (TS) 38.321 V16.3.0, which is incorporated herein by reference in its entirety, a Medium Access Control (MAC) entity may be configured by Radio Resource Control (RRC) with a DRX functionality that controls a User Equipment (UE)'s Physical Downlink Control Channel (PDCCH) monitoring activity for the MAC entity's Cell Radio Network Temporary Identifier (C-RNTI), Cancellation Indication RNTI (CI-RNTI), Configured Scheduling RNTI (CS-RNTI), Interruption RNTI (INT-RNTI), Slot Format Indication RNTI (SFI-RNTI), Semi-Persistent-Channel State Information (CSI)-RNTI (SP-CSI-RNTI), Transmit Power Control (TPC)-Physical Uplink Control Channel (PUCCH)—RNTI (TPC-PUCCH-RNTI), TPC-Physical Uplink Shared Channel (PUSCH)—RNTI (TPC-PUSCH-RNTI), TPC-Sounding Reference Signal (SRS)-RNTI (TPC-SRS-RNTI), and Availability Indicator RNTI (AI-RNTI). When using DRX operation, the MAC entity shall also monitor PDCCH according to requirements found in other clauses of TS 38.321. When in RRC_CONNECTED, if DRX is configured, for all the activated Serving Cells, the MAC entity may monitor the PDCCH discontinuously using the DRX operation specified in this clause, otherwise the MAC entity shall monitor the PDCCH as specified in TS 38.213, V16.4.0, which is incorporated herein by reference in its entirety. (NOTE 1: If sidelink resource allocation mode 1 is configured by RRC, a DRX functionality is not configured.)

RRC controls DRX operation by configuring the following parameters:

drx-onDurationTimer: the duration at the beginning of a DRX cycle;

drx-SlotOffset: the delay before starting the drx-onDurationTimer;

drx-InactivityTimer: the duration after the PDCCH occasion in which a PDCCH indicates a new Uplink (UL) or Downlink (DL) transmission for the MAC entity;

drx-RetransmissionTimerDL (per DL Hybrid Automatic Repeat request (HARQ) process except for the broadcast process): the maximum duration until a DL retransmission is received;

drx-RetransmissionTimer UL (per UL HARQ process): the maximum duration until a grant for UL retransmission is received;

drx-LongCycleStartOffset: the Long DRX cycle and drx-StartOffset which defines the subframe where the Long and Short DRX cycle starts;

drx-ShortCycle (optional): the Short DRX cycle;

drx-ShortCycle Timer (optional): the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity;

ps-Wakeup (optional): the configuration to start associated drx-onDurationTimer in case DCP (Downlink Control Information (DCI) with Cyclic Redundancy Check (CRC) scrambled by Power Saving RNTI (PS-RNTI)) is monitored but not detected;

ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;

ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

When a DRX cycle is configured, the Active Time for Serving Cells in a DRX group includes the time while:

drx-onDurationTimer or drx-InactivityTimer configured for the DRX group is running; or drx-RetransmissionTimerDL or drx-RetransmissionTimerUL is running on any Serving Cell in the DRX group; or ra-ContentionResolutionTimer (as described in clause 5.1.5 of TS 38.321 V 16.3.0) or msgB-ResponseWindow (as described in clause 5.1.4a of TS 38.321 V 16.3.0) is running; or a Scheduling Request is sent on PUCCH and is pending (as described in clause 5.4.4 of TS 38.321 V 16.3.0); or a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a of TS 38.321 V 16.3.0).

When DRX is configured, the MAC entity shall:

1> if a MAC PDU is received in a configured downlink assignment:

2> start the drx-HARQ-RTT-TimerDL for the corresponding HARQ process in the first symbol after the end of the corresponding transmission carrying the DL HARQ feedback;

2> stop the drx-RetransmissionTimerDL for the corresponding HARQ process.

-continued

1> if a MAC PDU is transmitted in a configured uplink grant and LBT failure
   indication is not received from lower layers:
   2> start the drx-HARQ-RTT-TimerUL for the corresponding HARQ process in the
      first symbol after the end of the first transmission (within a bundle) of the
      corresponding PUSCH transmission;
   2> stop the drx-RetransmissionTimerUL for the corresponding HARQ process at the
      first transmission (within a bundle) of the corresponding PUSCH transmission.
1> if a drx-HARQ-RTT-TimerDL expires:
   2> if the data of the corresponding HARQ process was not successfully decoded:
      3> start the drx-RetransmissionTimerDL for the corresponding HARQ process in
         the first symbol after the expiry of drx-HARQ-RTT-TimerDL.
1> if a drx-HARQ-RTT-TimerUL expires:
   2> start the drx-RetransmissionTimerUL for the corresponding HARQ process in the
      first symbol after the expiry of drx-HARQ-RTT-TimerUL.
1> if a DRX Command MAC CE or a Long DRX Command MAC CE is received:
   2> stop drx-onDurationTimer for each DRX group;
   2> stop drx-InactivityTimer for each DRX group.
1> if drx-InactivityTimer for a DRX group expires:
   2> if the Short DRX cycle is configured:
      3> start or restart drx-ShortCycleTimer for this DRX group in the first symbol
         after the expiry of drx-InactivityTimer;
      3> use the Short DRX cycle for this DRX group.
   2> else:
      3> use the Long DRX cycle for this DRX group.
1> if a DRX Command MAC CE is received:
   2> if the Short DRX cycle is configured:
      3> start or restart drx-ShortCycleTimer for each DRX group in the first symbol
         after the end of DRX Command MAC CE reception;
      3> use the Short DRX cycle for each DRX group.
   2> else:
      3> use the Long DRX cycle for each DRX group.
1> if drx-ShortCycleTimer for a DRX group expires:
   2> use the Long DRX cycle for this DRX group.
1> if a Long DRX Command MAC CE is received:
   2> stop drx-ShortCycleTimer for each DRX group;
   2> use the Long DRX cycle for each DRX group.
1> if the Short DRX cycle is used for a DRX group, and [(SFN $\times$ 10) + subframe
   number] modulo (drx-ShortCycle) = (drx-StartOffset) modulo (drx-ShortCycle):
   2> start drx-onDurationTimer for this DRX group after drx-SlotOffset from the
      beginning of the subframe.
1> if the Long DRX cycle is used for a DRX group, and [(SFN $\times$ 10) + subframe
   number] modulo (drx-LongCycle) = drx-StartOffset:
   2> if DCP monitoring is configured for the active DL BWP as specified in TS
      38.213 [2], clause 10.3:
      3> if DCP indication associated with the current DRX cycle received from lower
         layer indicated to start drx-onDurationTimer, as specified in TS 38.213 [2]; or
      3> if all DCP occasion(s) in time domain, as specified in TS 38.213 [2],
         associated with the current DRX cycle occurred in Active Time considering
         grants/assignments/DRX Command MAC CE/Long DRX Command MAC
         CE received and Scheduling Request sent until 4 ms prior to start of the last
         DCP occasion, or during a measurement gap, or when the MAC entity
         monitors for a PDCCH transmission on the search space indicated by
         recoverySearchSpaceId of the SpCell identified by the C-RNTI while the
         ra-ResponseWindow is running (as specified in clause 5.1.4 of TS 38.321 V
         16.3.0); or
      3> if ps-Wakeup is configured with value true and DCP indication associated
         with the current DRX cycle has not been received from lower layers:
         4> start drx-onDurationTimer after drx-SlotOffset from the beginning of the
            subframe.
   2> else:
      3> start drx-onDurationTimer for this DRX group after drx-SlotOffset from the
         beginning of the subframe.

NOTE 2: In case of unaligned SFN across carriers in a cell   55
   group, the SFN of the SpCell is used to calculate the
   DRX duration.

1> if a DRX group is in Active Time:
   2> monitor the PDCCH on the Serving Cells in this DRX group as specified in TS
      38.213 [2];
   2> if the PDCCH indicates a DL transmission:
      3> start the drx-HARQ-RTT-TimerDL for the corresponding HARQ process in
         the first symbol after the end of the corresponding transmission carrying the
         DL HARQ feedback;

NOTE 3: When HARQ feedback is postponed by PDSCH-to-HARQ_feedback timing indicating a non-numerical kl value, as specified in TS 38.213 [2], the corresponding transmission opportunity to send the DL HARQ feedback is indicated in a later PDCCH requesting the HARQ-ACK feedback.

As in ProSe in LTE, NR sidelink transmissions have the following two modes of resource allocations:

Mode 1: Sidelink resources are scheduled by a gNB.

Mode 2: The UE autonomously selects sidelink resources from one or more (pre)configured sidelink resource pools based on a channel sensing mechanism.

```
        3>  stop the drx-RetransmissionTimerDL for the corresponding HARQ process.
        3>  if the PDSCH-to-HARQ_feedback timing indicate a non-numerical kl value
            as specified in TS 38.213 [6]:
            4>  start the drx-RetransmissionTimerDL in the first symbol after the PDSCH
                transmission for the corresponding HARQ process.
    2>  if the PDCCH indicates a UL transmission:
        3>  start the drx-HARQ-RTT-TimerUL for the corresponding HARQ process in
            the first symbol after the end of the first transmission (within a bundle) of the
            corresponding PUSCH transmission;
        3>  stop the drx-RetransmissionTimerUL for the corresponding HARQ process.
    2>  if the PDCCH indicates a new transmission (DL or UL) on a Serving Cell in this
        DRX group:
        3>  start or restart drx-InactivityTimer for this DRX group in the first symbol after
            the end of the PDCCH reception.
    2>  if a HARQ process receives downlink feedback information and
        acknowledgement is indicated:
        3>  stop the drx-RetransmissionTimerUL for the corresponding HARQ process.
1>  if DCP monitoring is configured for the active DL BWP as specified in TS 38.213
    [2], clause 10.3; and
1>  if the current symbol n occurs within drx-onDurationTimer duration; and
1>  if drx-onDurationTimer associated with the current DRX cycle is not started as
    specified in this clause:
    2>  if the MAC entity would not be in Active Time considering
        grants/assignments/DRX Command MAC CE/Long DRX Command MAC CE
        received and Scheduling Request sent until 4 ms prior to symbol n when
        evaluating all DRX Active Time conditions as specified in this clause:
        3>  not transmit periodic SRS and semi-persistent SRS defined in TS 38.214 [3];
        3>  not report semi-persistent CSI configured on PUSCH;
        3>  if ps-TransmitPeriodicL1-RSRP is not configured with value true:
            4>  not report periodic CSI that is L1-RSRP on PUCCH.
        3>  if ps-TransmitOtherPeriodicCSI is not configured with value true:
            4>  not report periodic CSI that is not L1-RSRP on PUCCH.
1>  else:
    2>  in current symbol n, if a DRX group would not be in Active Time considering
        grants/assignments scheduled on Serving Cell(s) in this DRX group and DRX
        Command MAC CE/Long DRX Command MAC CE received and Scheduling
        Request sent until 4 ms prior to symbol n when evaluating all DRX Active Time
        conditions as specified in this clause:
        3>  not transmit periodic SRS and semi-persistent SRS defined in TS 38.214 [3]
            in this DRX group;
        3>  not report CSI on PUCCH and semi-persistent CSI configured on PUSCH in
            this DRX group.
    2>  if CSI masking (csi-Mask) is setup by upper layers:
        3>  in current symbol n, if drx-onDurationTimer of a DRX group would not be
            running considering grants/assignments scheduled on Serving Cell(s) in this
            DRX group and DRX Command MAC CE/Long DRX Command MAC CE
            received until 4 ms prior to symbol n when evaluating all DRX Active Time
            conditions as specified in this clause; and
            4>  not report CSI on PUCCH in this DRX group.
```

NOTE 4: If a UE multiplexes a CSI configured on PUCCH with other overlapping UCI(s) according to the procedure specified in TS 38.213 [6] clause 9.2.5 and this CSI multiplexed with other UCI(s) would be reported on a PUCCH resource outside DRX Active Time of the DRX group in which this PUCCH is configured, it is up to UE implementation whether to report this CSI multiplexed with other UCI(s).

Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214, V16.4.0, which is incorporated herein by reference in its entirety on the Serving Cells in the DRX group when such is expected.

The MAC entity needs not to monitor the PDCCH if it is not a complete PDCCH occasion (e.g. the Active Time starts or ends in the middle of a PDCCH occasion).

For an in-coverage UE, a gNB can be configured to adopt Mode 1 or Mode 2. For an out-of-coverage UE, only Mode 2 can be adopted.

As in LTE, scheduling over the sidelink in NR is done in different ways for Mode 1 and Mode 2.

Mode 1 supports the following two kinds of grants:

Dynamic grant: When the traffic to be sent over sidelink arrives at a transmitter UE, this UE should launch the four-message exchange procedure to request sidelink resources from a gNB (Scheduling Request (SR) on UL, grant, Buffer Status Report (BSR) on UL, grant for data on sidelink sent to UE). During the resource request procedure, the gNB may allocate a sidelink radio network temporary identifier (SL-RNTI) to the transmitter UE. If this sidelink resource request is granted by the gNB, then the gNB indicates the resource allocation for the PSCCH and the PSSCH in the downlink control information (DCI) conveyed by PDCCH with CRC scrambled with the SL-RNTI. When the transmitter UE receives such DCI, the transmitter UE can obtain the grant only if the scrambled CRC of DCI can be successfully solved by the assigned SL-RNTI. The transmitter UE then indicates the time-frequency resources and the transmission scheme of the allocated PSSCH in the PSCCH, and launches the PSCCH and the PSSCH on the allocated resources for sidelink transmissions. When the grant is obtained from the gNB, the transmitter UE can only transmit a single Transport Block (TB). As a result, this kind of grant is suitable for traffic with a loose latency requirement.

Configured grant: For the traffic with a strict latency requirement, performing the four-message exchange procedure to request sidelink resources may induce unacceptable latency. In this case, prior to the traffic arrival, a transmitter UE may perform the four-message exchange procedure and request a set of resources. If a grant can be obtained from a gNB, then the requested resources are reserved in a periodic manner. Upon traffic arriving at the transmitter UE, this UE can launch the PSCCH and the PSSCH on the upcoming resource occasion. In fact, this kind of grant is also known as grant-free transmissions.

In both dynamic grant and configured grant, a sidelink receiver UE cannot receive the DCI (since it is addressed to the transmitter UE), and therefore the receiver UE should perform blind decoding to identify the presence of PSCCH and find the resources for the PSSCH through the SCI.

When the transmitter UE launches the PSCCH, CRC is also inserted in the SCI without any scrambling.

In the Mode 2 resource allocation, when traffic arrives at the transmitter UE, this transmitter UE should autonomously select resources for the PSCCH and the PSSCH. To further minimize the latency of the feedback HARQ ACK/NACK transmissions and subsequently retransmissions, the transmitter UE may also reserve resources for PSCCH/PSSCH for retransmissions. To further enhance the probability of successful TB decoding at one shot and thus suppress the probability to perform retransmissions, the transmitter UE may repeat the TB transmission along with the initial TB transmission. This mechanism is also known as blind retransmission. As a result, when traffic arrives at the transmitter UE, then this transmitter UE should select resources for the following transmissions:

1) The PSSCH associated with the PSCCH for initial transmission and blind retransmissions.
2) The PSSCH associated with the PSCCH for retransmissions.

Since each transmitter UE in sidelink transmissions should autonomously select resources for above transmissions, how to prevent different transmitter UEs from selecting the same resources turns out to be a critical issue in Mode 2. A particular resource selection procedure is therefore imposed to Mode 2 based on channel sensing. The channel sensing algorithm involves measuring RSRP on different sub-channels and requires knowledge of the different UEs power levels of DMRS on the PSSCH or the DMRS on the PSCCH depending on the configuration. This information is known only after receiver SCI launched by (all) other UEs. The sensing and selection algorithm is rather complex.

For a sidelink in the NR, unicasts at the Access Stratum (AS) are supported for services requiring high reliabilities. As shown in FIG. 1, between a pair of UEs (UE A and UE B), there can be multiple unicast sidelinks each supporting multiple sidelink QoS flows or Radio Bearers (RBs). At the AS, each link can be identified by a source Layer 2 (L2) Identification (ID) and a destination L2 ID. For instance, in FIG. 1, a PC5 unicast link 1 can include three QoS flows: PC5 QoS Flow #1, PC5 QoS Flow #2, and PC5 QoS Flow #3, and can be identified by a pair of an L2 ID1 corresponding to an Application ID 1 and an L2 ID2 corresponding to an Application ID 2. In FIG. 1, a PC5 unicast link 2 can include two QoS flows: PC5 QoS Flow #4 and PC5 QoS Flow #5, and can be identified by a pair of an L2 ID3 corresponding to an Application ID 3 and an L2 ID4 corresponding to an Application ID 4.

More specifically, at physical layer, HARQ ACK/NACK feedback can be configured such that the receiver UE in a sidelink unicast pair will send ACK when the TB is received successfully or send NACK when the TB reception fails. Besides Radio Link Control (RLC) Un-acknowledgement Mode (UM), RLC Acknowledgement Mode (AM) can also be configured for NR sidelink unicast transmission/reception. When RLC AM is configured, depending on RLC Protocol Data Unit (PDU) reception failure, the receiver UE can send an RLC status report to the transmitter UE and request retransmitting the missing RLC PDUs.

Figure 2A:
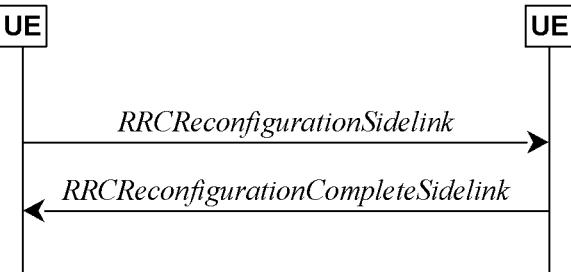
FIGS. 2A and 2B are schematic diagrams showing sidelink AS-layer configuration procedures.
Figure 2B:
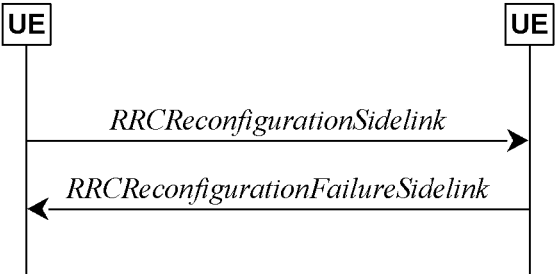

In addition, one UE may configure the unicast link or SLRB that is to be established or reconfigure the unicast link or SLRB that is already established. FIG. 2A shows a sidelink configuration procedure based on PC5-RRC signaling. As shown, first an initiating UE (e.g., UE 1 in the figure) sends Access Stratum (AS) configurations that it intends to use for a PC5 link or SLRB with a peer UE (e.g., UE 2 in the figure). If the peer UE (i.e., UE 2) is able to comply with the received configurations in the configuration message, it initiates PC5-RRC based AS layer configuration complete. Otherwise, the peer UE (i.e., UE 2) initiates PC5-RRC based AS layer configuration failure, as shown in FIG. 2B.

Figures 3, 4:
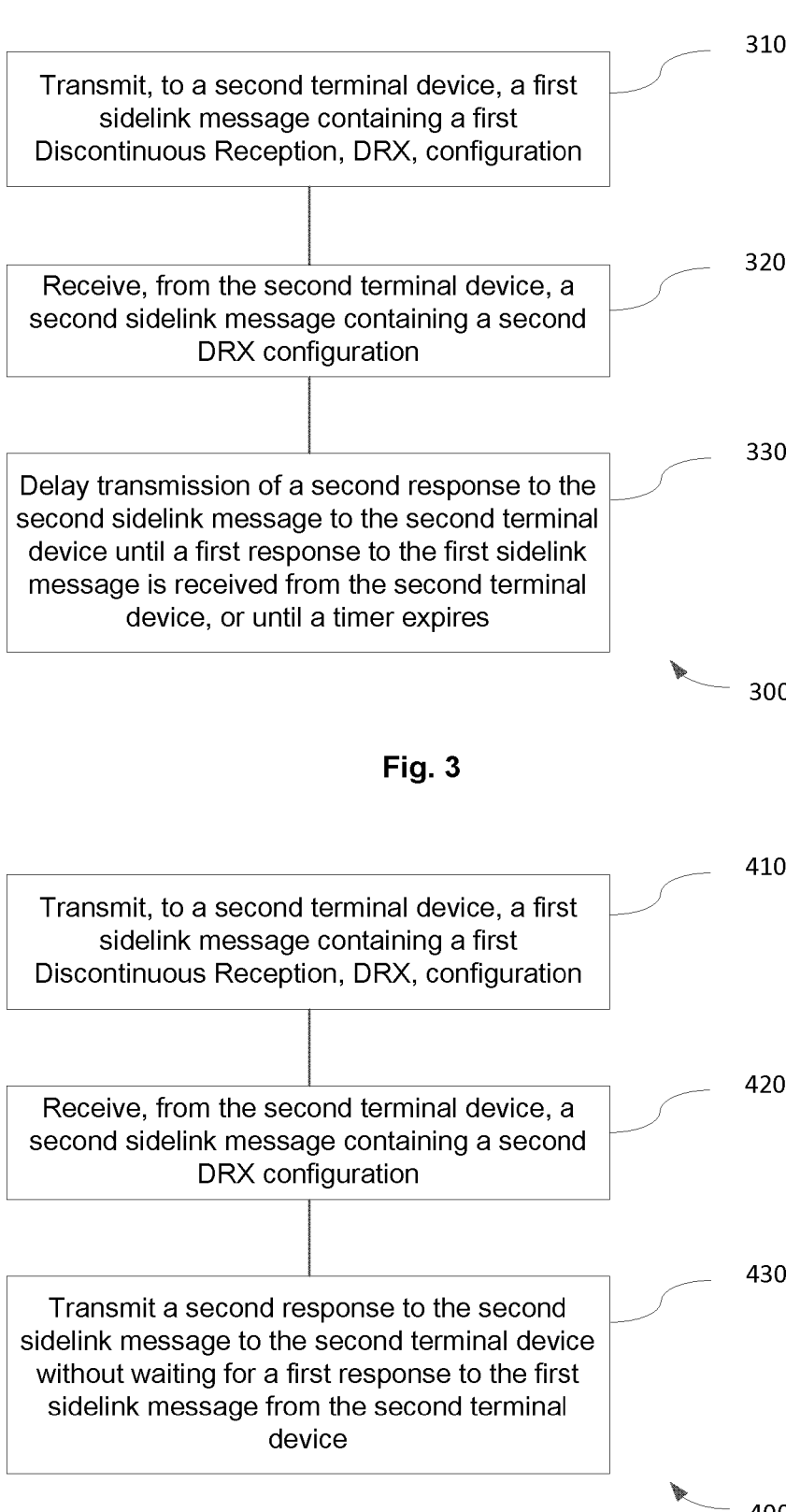
FIG. 3 is a flowchart illustrating a method in a first terminal device according to an embodiment of the present disclosure.
FIG. 4 is a flowchart illustrating a method in a first terminal device according to another embodiment of the present disclosure.

FIG. 3 is a flowchart illustrating a method 300 according to an embodiment of the present disclosure. The method 300 can be performed by a first terminal device.

At block 310, a first sidelink message containing a first DRX configuration is transmitted to a second terminal device.

At block 320, a second sidelink message containing a second DRX configuration is received from the second terminal device.

In an example, each of the first DRX configuration and the second DRX configuration may be for a bidirectional link between the first terminal device and the second terminal device. Alternatively, the first DRX configuration may be for a unidirectional link from the first terminal device to the second terminal device, and the second DRX configuration may be for a unidirectional link from the second terminal device to the first terminal device.

In an example, the first sidelink message may be for sidelink unicast establishment or SLRB setup (e.g., RRCReconfigurationSidelink) for a unidirectional link from the first terminal device to the second terminal device, and the second sidelink message may be for sidelink unicast establishment or SLRB setup (e.g., RRCReconfigurationSidelink) for a unidirectional link from the second terminal device to the first terminal device. The first sidelink message and the second sidelink message may be associated with a same type of service or with different types of services.

At block 330, transmission of a second response (e.g., RRCReconfigurationCompleteSidelink) to the second sidelink message to the second terminal device is delayed until a first response (e.g., RRCReconfigurationCompleteSidelink) to the first sidelink message is received from the second terminal device.

In an example, the first response may contain a suggested change to the first DRX configuration. The first terminal device may update the first DRX configuration based on the suggested change to the first DRX configuration. Here, the updated first DRX configuration and the second DRX configuration may contain respective on-duration timers and/or inactivity timers that are configured separately, and one or more DRX parameters that are configured to be common to the updated first DRX configuration and the second DRX configuration. The one or more DRX parameters may include a slot offset, a retransmission timer, a long cycle start offset, a short cycle, a short cycle timer, and/or an HARQ RTT timer.

In an example, the first terminal device can transmit the second response to the second terminal device, e.g., after receiving the first response. The second response may contain a suggested change to the second DRX configuration. The suggested change to the second DRX configuration may be determined based on the updated first DRX configuration.

Alternatively, in the block 330, the transmission of the second response can be delayed until a timer expires. The timer may be preconfigured, or may be configured by a gNB or another terminal device controlling the first and second terminal devices. For example, the timer can be started upon receiving the second sidelink message, and can be stopped upon receiving the first response. When the timer expires or is stopped, the first terminal device can transmit the second response to the second terminal device. Again, the second response may contain a suggested change to the second DRX configuration, and the suggested change to the second DRX configuration may be determined based on the updated first DRX configuration. In an example, when a corresponding timer is also provided at the second terminal device, the timer configured at the first terminal device can be set to a different value from the corresponding timer provided at the second terminal device, so as to further avoid a race condition.

In an example, the first sidelink message and/or the second response may be transmitted, and/or the second sidelink message and/or the first response may be received, via: PC5-RRC signaling, PC5-S, discovery signaling, MAC CE, or L1 signaling (e.g., SCI).

In an example, the first terminal device may receive, from a network node (e.g., a gNB, an SMF node, or a PCF node) or another terminal device controlling the first terminal device and/or the second terminal device, a configuration for the delaying. Here, the configuration may be received from the gNB via RRC signaling, MAC CE, or L1 signaling (e.g., PDCCH). Alternatively, the configuration may be received from the SMF node or the PCF node via NAS RRC signaling. Alternatively, the configuration may be received from the other terminal device via: PC5-RRC signaling, PC5-S, discovery signaling, MAC CE, or L1 signaling (e.g., SCI).

Additional negotiation may be initiated after establishment of the sidelink or SLRB between the first and second terminal devices for further alignment of sidelink DRX configurations between the first and second terminal devices.

FIG. 4 is a flowchart illustrating a method 400 according to another embodiment of the present disclosure. The method 400 can be performed by a first terminal device.

At block 410, a first sidelink message containing a first DRX configuration is transmitted to a second terminal device.

At block 420, a second sidelink message containing a second DRX configuration is received from the second terminal device.

In an example, each of the first DRX configuration and the second DRX configuration may be for a bidirectional link between the first terminal device and the second terminal device. Alternatively, the first DRX configuration may be for a unidirectional link from the first terminal device to the second terminal device, and the second DRX configuration may be for a unidirectional link from the second terminal device to the first terminal device.

In an example, the first sidelink message may be for sidelink unicast establishment or SLRB setup (e.g., RRCReconfigurationSidelink) for a unidirectional link from the first terminal device to the second terminal device, and the second sidelink message may be for sidelink unicast establishment or SLRB setup (e.g., RRCReconfigurationSidelink) for a unidirectional link from the second terminal device to the first terminal device. The first sidelink message and the second sidelink message may be associated with a same type of service or with different types of services.

At block 430, a second response to the second sidelink message is transmitted to the second terminal device without waiting for a first response to the first sidelink message from the second terminal device.

In an example, the first terminal device may transmit the second response as if it has not transmitted the first sidelink message to the second terminal device. For example, the second response may contain an ACK or success information indicating that the second DRX configuration is applicable to the first terminal device, or a NACK or failure information indicating that the second DRX configuration is not applicable to the first terminal device. Moreover, the second response may further contain a suggested change to the second DRX configuration. The suggested change to the second DRX configuration may be determined based on the first DRX configuration.

In another example, the first terminal device may consider a race condition in DRX configuration negotiation between the first terminal device and the second terminal device (the second sidelink message received before any response to the first sidelink message is received) as a failure case. For example, the second response may be a failure response (e.g., RRCReconfigurationFailureSidelink). The second response may contain a failure cause associated with the race condition, or with a misalignment between the first DRX configuration and the second DRX configuration. When the second sidelink message is for sidelink unicast establishment or SLRB setup for the unidirectional link from the second terminal device to the first terminal device, the unidirectional link will not be established and the second terminal device can retransmit the signaling for sidelink unicast establishment or SLRB setup later (e.g., after the unidirectional link from the first terminal device to the second terminal device has been established). In this case, after receiving the first response from the second terminal device, the first terminal device may receive a third sidelink message (for sidelink unicast establishment or SLRB setup for the unidirectional link from the second terminal device to the first terminal device, e.g., RRCReconfigurationSidelink) from the second terminal device, as a result of failure of the second sidelink message, and transmit a third response (e.g., RRCReconfigurationCompleteSidelink) to the third sidelink message to the second terminal device. Here, the second response may further contain e.g., an indication of expected time at which the second terminal device is to transmit the third sidelink message.

In an example, the first sidelink message and/or the second response may be transmitted, and/or the second sidelink message and/or the first response may be received, via: PC5-RRC signaling, PC5-S, discovery signaling, MAC CE, or L1 signaling (e.g., SCI).

In an example, the first terminal device may receive, from a network node (e.g., a gNB, an SMF node, or a PCF node) or another terminal device controlling the first terminal device and/or the second terminal device, a configuration for transmitting the second response without waiting for the first response. Here, the configuration may be received from the gNB via RRC signaling, MAC CE, or L1 signaling (e.g., PDCCH). Alternatively, the configuration may be received from the SMF node or the PCF node via NAS RRC signaling. Alternatively, the configuration may be received from the other terminal device via: PC5-RRC signaling, PC5-S, discovery signaling, MAC CE, or L1 signaling (e.g., SCI).

Additional negotiation may be initiated after establishment of the sidelink or SLRB between the first and second terminal devices for further alignment of sidelink DRX configurations between the first and second terminal devices.

FIG. 5 is a flowchart illustrating a method 500 according to another embodiment of the present disclosure. The method 500 can be performed by a second terminal device.

At block 510, a first sidelink message containing a first DRX configuration is received from a first terminal device.

At block 520, a second sidelink message containing a second DRX configuration is transmitted to the first terminal device, before a first response to the first sidelink message is transmitted to the first terminal device.

In an example, each of the first DRX configuration and the second DRX configuration may be for a bidirectional link between the first terminal device and the second terminal device. Alternatively, the first DRX configuration may be for a unidirectional link from the first terminal device to the second terminal device, and the second DRX configuration may be for a unidirectional link from the second terminal device to the first terminal device.

In an example, the first sidelink message may be for sidelink unicast establishment or SLRB setup (e.g., RRCReconfigurationSidelink) for a unidirectional link from the first terminal device to the second terminal device, and the second sidelink message may be for sidelink unicast establishment or SLRB setup (e.g., RRCReconfigurationSidelink) for a unidirectional link from the second terminal device to the first terminal device. The first sidelink message and the second sidelink message may be associated with a same type of service or with different types of services.

At block 530, a second response to the second sidelink message is received from the first terminal device.

In an example, the second response may contain an ACK or success information indicating that the second DRX configuration is applicable to the first terminal device, or a NACK or failure information indicating that the second DRX configuration is not applicable to the first terminal device. Moreover, the second response may further contain a suggested change to the second DRX configuration. The suggested change to the second DRX configuration may be determined based on the first DRX configuration.

In another example, the second response may be a failure response (e.g., RRCReconfigurationFailureSidelink). The second response may contain a failure cause associated with the race condition, or with a misalignment between the first DRX configuration and the second DRX configuration. When the second sidelink message is for sidelink unicast establishment or SLRB setup for the unidirectional link from the second terminal device to the first terminal device, the unidirectional link will not be established and the second terminal device can retransmit the signaling for sidelink unicast establishment or SLRB setup later (e.g., after the unidirectional link from the first terminal device to the second terminal device has been established). In this case, after transmitting the first response to the first terminal device, the second terminal device may transmit a third sidelink message (for sidelink unicast establishment or SLRB setup for the unidirectional link from the second terminal device to the first terminal device, e.g., RRCReconfigurationSidelink) to the first terminal device, as a result of failure of the second sidelink message, and receive a third response (e.g., RRCReconfigurationCompleteSidelink) to the third sidelink message from the first terminal device. Here, the second response may further contain e.g., an indication of expected time at which the second terminal device is to transmit the third sidelink message.

In an example, the first sidelink message and/or the second response may be received, and/or the second sidelink message and/or the first response may be transmitted, via: PC5-RRC signaling, PC5-S, discovery signaling, MAC CE, or L1 signaling (e.g., SCI).

Additional negotiation may be initiated after establishment of the sidelink or SLRB between the first and second terminal devices for further alignment of sidelink DRX configurations between the first and second terminal devices.

FIG. 6 is a flowchart illustrating a method 600 according to another embodiment of the present disclosure. The method 600 can be performed by a first terminal device.

At block 610, it is determined that a condition for initiating sidelink unicast establishment or SLRB setup is met.

Here, the condition may include traffic or data being available for transmission to the second terminal device.

At block 620, transmission of a sidelink message for sidelink unicast establishment or SLRB setup to a second terminal device is delayed by a random time length.

Here, the random time length may follow a random variable distribution, which may be selected by the first terminal device from e.g., normal distribution, uniform distribution, Cauchy distribution, exponential distribution, lognormal distribution, or the like.

By delaying the transmission of the sidelink message randomly, the probability that the first and second terminal devices transmit sidelink messages for sidelink unicast establishment or SLRB setup to each other at the same time, and accordingly the probability that a race condition occurs in DRX configuration negotiation between the first and second terminal devices, can be greatly reduced. This approach may be used for applications or services that are not delay sensitive or have large Packet Delay Budgets (PDBs).

In an example, the sidelink message may be transmitted via: PC5-RRC signaling, PC5-S, discovery signaling, MAC CE, or L1 signaling (e.g., SCI).

FIG. 7 is a flowchart illustrating a method 700 according to another embodiment of the present disclosure. The method 700 can be performed by a first terminal device which is e.g., in coverage.

At block 710, an indication is received from a network node (e.g., a gNB, an SMF node, or a PCF node). The indication indicates which of the first terminal device and a second terminal device is to initiate sidelink unicast establishment or SLRB setup first for a bidirectional service between the first terminal device and the second terminal device.

At block 720, the indication is forwarded to the second terminal device.

In an example, when the indication indicates that the first terminal device is to initiate the sidelink unicast establishment or SLRB setup first, the first terminal device can transmit, to the second terminal device, a sidelink message for sidelink unicast establishment or SLRB setup for a unidirectional link from the first terminal device to the second terminal device. On the other hand, when the indication indicates that the second terminal device is to initiate the sidelink unicast establishment or SLRB setup first, the first terminal device can transmit, to the second terminal device, a sidelink message for sidelink unicast establishment or SLRB setup for a unidirectional link from the first terminal device to the second terminal device, after a unidirectional link from the second terminal device to the first terminal device has been established.

In an example, in the block 710, the indication may be received from the gNB via RRC signaling, MAC CE, or L1 signaling (e.g., PDCCH), or the indication may be received from the SMF node or the PCF node via NAS RRC signaling. In the block 720, the indication may be forwarded to the second terminal device via PC5-RRC signaling, PC5-S, discovery signaling, MAC CE, or L1 signaling (e.g., SCI).

FIG. 8 is a flowchart illustrating a method 800 according to another embodiment of the present disclosure. The method 800 can be performed by a second terminal device.

At block 810, an indication is received from a first terminal device. The indication indicates which of the first terminal device and the second terminal device is to initiate sidelink unicast establishment or SLRB setup first for a bidirectional service between the first terminal device and the second terminal device.

In an example, when the indication indicates that the second terminal device is to initiate the sidelink unicast establishment or SLRB setup first, the second terminal device can transmit, to the first terminal device, a sidelink message for sidelink unicast establishment or SLRB setup for a unidirectional link from the second terminal device to the first terminal device. On the other hand, when the indication indicates that the first terminal device is to initiate the sidelink unicast establishment or SLRB setup first, the second terminal device can transmit, to the first terminal device, a sidelink message for sidelink unicast establishment or SLRB setup for a unidirectional link from the second terminal device to the first terminal device, after a unidirectional link from the first terminal device to the second terminal device has been established.

In an example, in the block 810, the indication may be received via PC5-RRC signaling, PC5-S, discovery signaling, MAC CE, or L1 signaling (e.g., SCI).

FIG. 9 is a flowchart illustrating a method 900 according to another embodiment of the present disclosure. The method 900 can be performed by a network node (e.g., a gNB, an SMF node, or a PCF node).

At block 910, an indication is transmitted to a first terminal device. The indication indicates which of the first terminal device and a second terminal device is to initiate sidelink unicast establishment or SLRB setup first for a bidirectional service between the first terminal device and the second terminal device.

Here, when the network node is the gNB, the configuration may be transmitted via RRC signaling, MAC CE, or L1 signaling (e.g., PDCCH). Alternatively, when the network node is the SMF node or the PCF node, the configuration may be transmitted via NAS RRC signaling.

FIG. 10 is a flowchart illustrating a method 1000 according to another embodiment of the present disclosure. The method 1000 can be performed by a first terminal device.

At block 1010, a first sidelink message for sidelink unicast establishment or SLRB setup for a unidirectional link from the first terminal device to a second terminal device is transmitted to a second terminal device.

At block 1020, a second sidelink message for sidelink unicast establishment or SLRB setup for a unidirectional link from the second terminal device to the first terminal device is received from the second terminal device.

At block 1030, it is determined which of the first sidelink message and the second sidelink message is to be prioritized.

In an example, the first sidelink message may contain a first timestamp (e.g., indicating the time at which the message is transmitted, triggered, or generated) and the second sidelink message contains a second timestamp (e.g., indicating the time at which the message is transmitted, triggered, or generated). In the block 1030, it is determined to prioritize the first sidelink message when the first timestamp is earlier than the second timestamp, or to prioritize the second sidelink message when the second timestamp is earlier than the first timestamp. If the first timestamp and the second timestamp are the same, the first sidelink message or the second sidelink message can be prioritized randomly.

In another example, it can be determined to prioritize the first sidelink message or the second sidelink message based on a first weight or priority associated with the first terminal device and a second weight or priority associated with the second terminal device. Here, the first weight or priority may be a first fixed value (e.g., a UE ID, which may be an L2 ID or an application ID) configured for the first terminal device, and the second weight or priority is a second fixed value (e.g., a UE ID, which may be an L2 ID or an application ID) configured for the second terminal device. Alternatively, the first weight or priority or the second weight or priority may be dependent on one or more of the following associated with the first or second terminal device:

a UE category (e.g., power saving may be more important to public safety terminal devices than other types of commercial terminal devices, and the public safety terminal devices can be assigned with higher weights or priorities than other types of terminal devices), a UE capability (e.g., a terminal device supporting more features e.g., Multiple Input Multiple Output (MIMO) can be assigned with a higher weight or priority than another terminal device supporting fewer features e.g., without MIMO), a battery life (e.g., a terminal device with a lower battery life can be assigned with a higher weight or priority than another terminal device with a higher battery life), a type of a current service (e.g., a terminal device with public safety service may be assigned with a higher weight or priority than another UE with Vehicle-to-Everything (V2X) service in terms of power saving), a priority of the current service (e.g., priority of a service may be determined depending on power saving requirements, and a service with higher battery saving requirement (e.g., public safety) may be assigned with a higher weight or priority in terms of power saving than another service with lower battery saving requirement (e.g., V2X)), a QoS requirement for the current service (e.g., a service with higher battery saving requirement (e.g., public safety) may be assigned with a higher weight or priority in terms of power saving than another service with lower battery saving requirement (e.g., V2X)), or a geographical location (e.g., terminal devices located in an emergency area may need long battery lives than terminal devices in an area without emergency situation, and therefore a terminal device located in an emergency area may be assigned with a higher weight or priority than another terminal device in an area without emergency situation).

In an example, the first sidelink message may be transmitted, and/or the second sidelink message may be received, via PC5-RRC signaling, PC5-S, discovery signaling, MAC CE, or L1 signaling (e.g., SCI).

Correspondingly to the method 300 as described above, a first terminal device is provided. FIG. 11 is a block diagram of a first terminal device 1100 according to an embodiment of the present disclosure.

The first terminal device 1100 may be operative to perform the method 300 as described above in connection with FIG. 3. The first terminal device 1100 may include a transmitting unit 1110 configured to transmit, to a second terminal device, a first sidelink message containing a first DRX configuration. The first terminal device 1100 further includes a receiving unit 1120 configured to receive, from the second terminal device, a second sidelink message containing a second DRX configuration. The first terminal device 1100 further includes a delaying unit 1130 configured to delay transmission of a second response to the second sidelink message to the second terminal device until a first response to the first sidelink message is received from the second terminal device, or until a timer expires.

In an embodiment, the first response may contain a suggested change to the first DRX configuration, and the method may further include: updating the first DRX configuration based on the suggested change to the first DRX configuration.

In an embodiment, the updated first DRX configuration and the second DRX configuration may contain respective on-duration timers and/or inactivity timers that are configured separately, and one or more DRX parameters that are configured to be common to the updated first DRX configuration and the second DRX configuration.

In an embodiment, the one or more DRX parameters may include a slot offset, a retransmission timer, a long cycle start offset, a short cycle, a short cycle timer, and/or a Hybrid Automatic Repeat request (HARQ) Round-Trip Time (RTT) timer.

In an embodiment, the method may further include: transmitting the second response to the second terminal device, the second response containing a suggested change to the second DRX configuration.

In an embodiment, the suggested change to the second DRX configuration may be determined based on the updated first DRX configuration.

In an embodiment, the timer may be set to a different value from a corresponding timer provided at the second terminal device.

In an embodiment, each of the first DRX configuration and the second DRX configuration may be for a bidirectional link between the first terminal device and the second terminal device, or the first DRX configuration may be for a unidirectional link from the first terminal device to the second terminal device, and the second DRX configuration is for a unidirectional link from the second terminal device to the first terminal device.

In an embodiment, the first sidelink message may be for sidelink unicast establishment or Sidelink Radio Bearer (SLRB) setup for a unidirectional link from the first terminal device to the second terminal device, and the second sidelink message may be for sidelink unicast establishment or SLRB setup for a unidirectional link from the second terminal device to the first terminal device.

In an embodiment, the first sidelink message and the second sidelink message may be associated with a same type of service or with different types of services.

In an embodiment, the first sidelink message and/or the second response may be transmitted, and/or the second sidelink message and/or the first response may be received, via: PC5-Radio Resource Control (RRC) signaling, PC5-Signaling (PC5-S) discovery signaling, Medium Access Control (MAC) Control Element (CE), or Layer 1 (L1), signaling.

In an embodiment, the method may further include: receiving, from a network node or another terminal device controlling the first terminal device and/or the second terminal device, a configuration for the delaying.

In an embodiment, the network node may be a next generation Node B (gNB), a Session Management Function (SMF) node, or a Policy Control Function (PCF) node.

In an embodiment, the configuration may be received from the gNB via: RRC signaling, MAC CE or L1 signaling; the configuration may be received from the SMF node or the PCF node via: Non-Access Stratum (NAS) RRC signaling; or the configuration may be received from the other terminal device via: PC5-RRC signaling, PC5-S discovery signaling, MAC CE, or L1 signaling.

The units 1110-1130 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 3.

Figure 12:
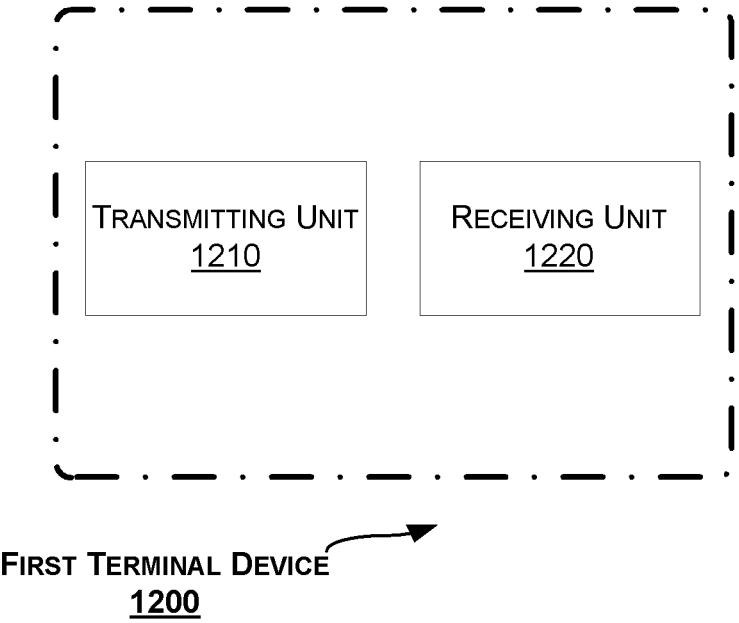
FIG. 12 is a block diagram of a first terminal device according to another embodiment of the present disclosure.

Correspondingly to the method 400 as described above, a first terminal device 1200 is provided. FIG. 12 is a block diagram of a first terminal device 1200 according to an embodiment of the present disclosure.

The first terminal device 1200 may be operative to perform the method 400 as described above in connection with FIG. 4. The first terminal device 1200 may include a transmitting unit 1210 configured to transmit, to a second terminal device, a first sidelink message containing a first DRX configuration. The transmitting unit 1210 is further configured to transmit a second response to the second sidelink message to the second terminal device without waiting for a first response to the first sidelink message from the second terminal device. The first terminal device 1200 further includes a receiving unit 1220 configured to receive, from the second terminal device, a second sidelink message containing a second DRX configuration.

In an embodiment, the second response may contain an Acknowledgement (ACK) or success information indicating that the second DRX configuration is applicable to the first terminal device, or a Negative Acknowledgement (NACK) or failure information indicating that the second DRX configuration is not applicable to the first terminal device.

In an embodiment, the second response may further contain a suggested change to the second DRX configuration.

In an embodiment, the suggested change to the second DRX configuration may be determined based on the first DRX configuration.

In an embodiment, the second response may be a failure response.

In an embodiment, the second response may contain a failure cause associated with a race condition in DRX configuration negotiation between the first terminal device and the second terminal device, or with a misalignment between the first DRX configuration and the second DRX configuration.

In an embodiment, the method may further include: receiving the first response from the second terminal device; receiving a third sidelink message from the second terminal device, as a result of failure of the second sidelink message; and transmitting a third response to the third sidelink message to the second terminal device.

In an embodiment, the second response may further contain an indication of expected time at which the second terminal device is to transmit the third sidelink message.

In an embodiment, each of the first DRX configuration and the second DRX configuration may be for a bidirectional link between the first terminal device and the second terminal device, or the first DRX configuration may be for a unidirectional link from the first terminal device to the second terminal device and the second DRX configuration is for a unidirectional link from the second terminal device to the first terminal device.

In an embodiment, the first sidelink message may be for sidelink unicast establishment or SLRB setup for a unidirectional link from the first terminal device to the second terminal device, and the second sidelink message may be for sidelink unicast establishment or SLRB setup for a unidirectional link from the second terminal device to the first terminal device.

In an embodiment, the first sidelink message and the second sidelink message may be associated with a same type of service or with different types of services.

In an embodiment, the first sidelink message and/or the second response may be transmitted, and/or the second sidelink message and/or the first response may be received, via: PC5-RRC signaling, PC5-S discovery signaling, MAC CE or L1 signaling.

In an embodiment, the method may further include: receiving, from a network node or another terminal device controlling the first terminal device and/or the second terminal device, a configuration for transmitting the second response without waiting for the first response.

In an embodiment, the network node may be a gNB a SMF node, or a PCF node.

In an embodiment, the configuration may be received from the gNB via: RRC signaling, MAC CE or L1 signaling; the configuration may be received from the SMF node or the PCF node via: NAS RRC signaling; or the configuration may be received from the other terminal device via: PC5-RRC signaling, PC5-S discovery signaling, MAC CE, or L1 signaling.

The units 1210-1220 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 4.

Figure 13:
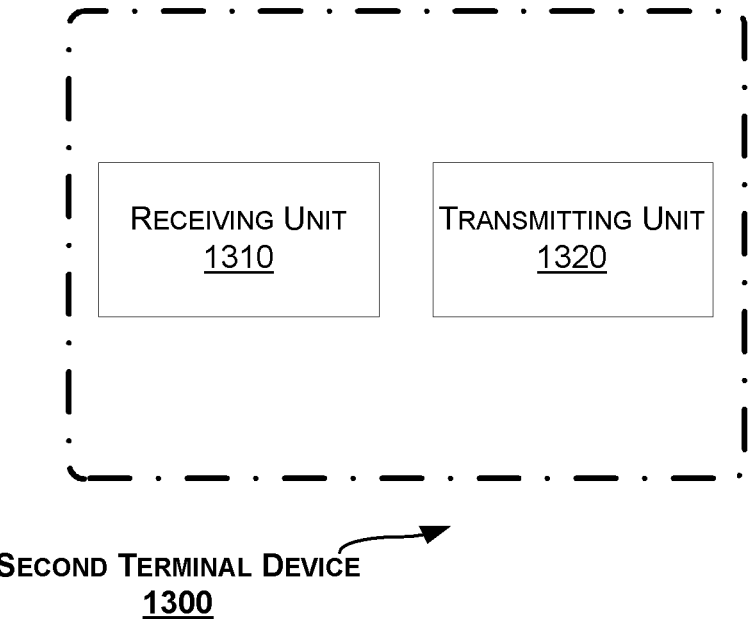
FIG. 13 is a block diagram of a second terminal device according to an embodiment of the present disclosure.

Correspondingly to the method 500 as described above, a second terminal device is provided. FIG. 13 is a block diagram of a second terminal device 1300 according to an embodiment of the present disclosure.

The second terminal device 1300 may be operative to perform the method 500 as described above in connection with FIG. 5. The second terminal device 1300 may include a receiving unit 1310 configured to receiving, from a first terminal device, a first sidelink message containing a first DRX configuration. The receiving unit 1310 is further configured to receive a second response to the second sidelink message from the first terminal device. The second terminal device 1300 further include a transmitting unit 1320 configured to transmit, to the first terminal device, a second sidelink message containing a second DRX configuration, before transmitting a first response to the first sidelink message to the first terminal device.

In an embodiment, the second response may contain an Acknowledgement (ACK) or success information indicating that the second DRX configuration is applicable to the first terminal device, or a NACK or failure information indicating that the second DRX configuration is not applicable to the first terminal device.

In an embodiment, the second response may further contain a suggested change to the second DRX configuration.

In an embodiment, the suggested change to the second DRX configuration may be determined based on the first DRX configuration.

In an embodiment, the second response may be a failure response.

In an embodiment, the second response may contain a failure cause associated with a race condition in DRX configuration negotiation between the first terminal device and the second terminal device, or with a misalignment between the first DRX configuration and the second DRX configuration.

In an embodiment, the method may further include: transmitting the first response to the first terminal device; transmitting a third sidelink message to the first terminal device, as a result of failure of the second sidelink message; and receiving a third response to the third sidelink message from the first terminal device.

In an embodiment, the second response may further contain an indication of expected time at which the second terminal device is to transmit the third sidelink message.

In an embodiment, each of the first DRX configuration and the second DRX configuration may be for a bidirectional link between the first terminal device and the second terminal device, or the first DRX configuration may be for a unidirectional link from the first terminal device to the second terminal device and the second DRX configuration is for a unidirectional link from the second terminal device to the first terminal device.

In an embodiment, the first sidelink message may be for sidelink unicast establishment or SLRB setup for a unidirectional link from the first terminal device to the second terminal device, and the second sidelink message may be for sidelink unicast establishment or SLRB setup for a unidirectional link from the second terminal device to the first terminal device.

In an embodiment, the first sidelink message and the second sidelink message may be associated with a same type of service or with different types of services.

In an embodiment, the first sidelink message and/or the second response may be received, and/or the second sidelink message and/or the first response may be transmitted via: PC5-RRC signaling, PC5-S discovery signaling, MAC CE or L1 signaling.

The units 1310-1320 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 5.

Figure 14:
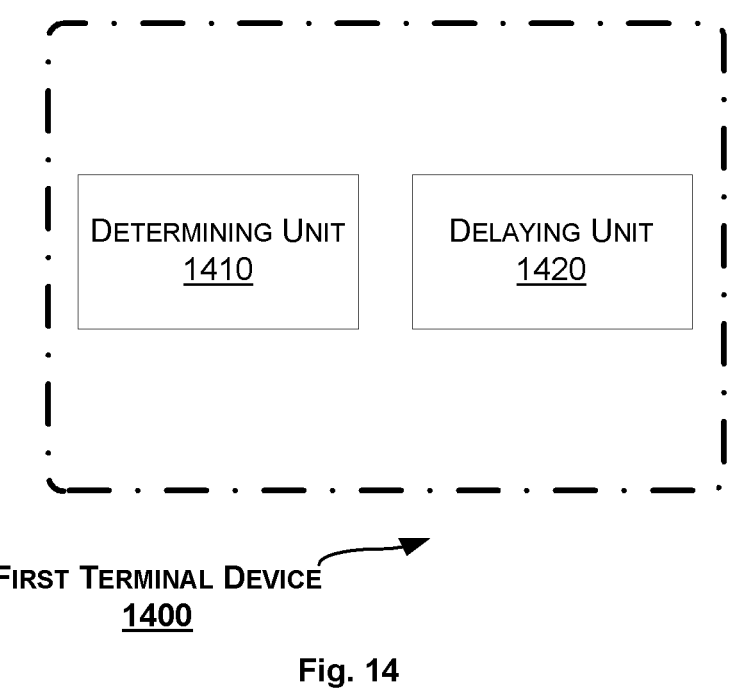
FIG. 14 is a block diagram of a first terminal device according to yet another embodiment of the present disclosure.

Correspondingly to the method 600 as described above, a first terminal device is provided. FIG. 14 is a block diagram of a first terminal device 1400 according to an embodiment of the present disclosure.

The first terminal device 1400 may be operative to perform the method 600 as described above in connection with FIG. 6. The first terminal device 1400 may include a determining unit 1410 configured to determine that a condition for initiating sidelink unicast establishment or SLRB setup is met. The first terminal device 1400 further includes a delaying unit 1420 configured to delay transmission of a sidelink message for sidelink unicast establishment or SLRB setup to a second terminal device by a random time length.

In an embodiment, the condition may include traffic or data being available for transmission to the second terminal device.

In an embodiment, the random time length may follow a random variable distribution.

In an embodiment, the sidelink message may be transmitted via: PC5-RRC signaling, PC5-S discovery signaling, MAC CE or L1 signaling.

The units 1410-1420 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 6.

Figure 15:
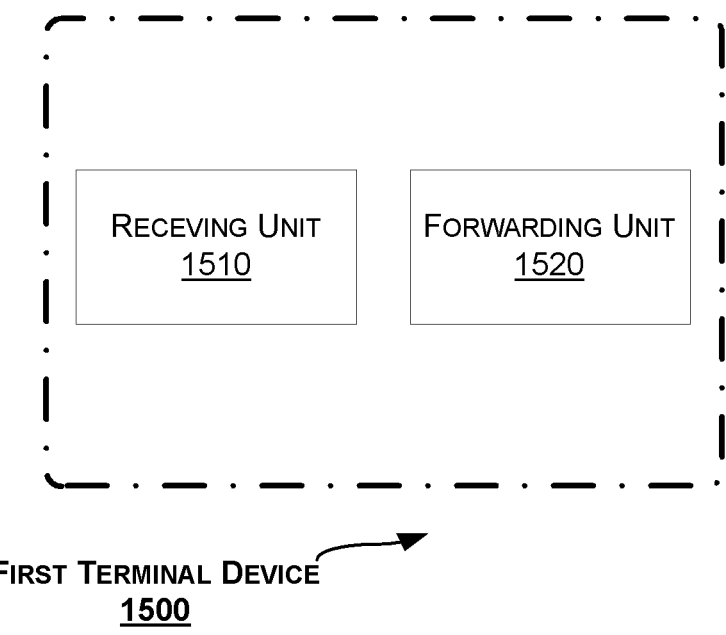
FIG. 15 is a block diagram of a first terminal device according to still another embodiment of the present disclosure.

Correspondingly to the method 700 as described above, a first terminal device is provided. FIG. 15 is a block diagram of a first terminal device 1500 according to an embodiment of the present disclosure.

The first terminal device 1500 may be operative to perform the method 700 as described above in connection with FIG. 7. The first terminal device 1500 may include a receiving unit 1510 configured to receive, from a network node, an indication indicating which of the first terminal device and a second terminal device is to initiate sidelink unicast establishment or SLRB setup first for a bidirectional service between the first terminal device and the second terminal device. The first terminal device 1510 further include a forwarding unit 1520 configured to forward the indication to the second terminal device.

In an embodiment, the method may further include, when the indication indicates that the first terminal device is to initiate the sidelink unicast establishment or SLRB setup first: transmitting, to the second terminal device, a sidelink message for sidelink unicast establishment or SLRB setup for a unidirectional link from the first terminal device to the second terminal device.

In an embodiment, the method may further include, when the indication indicates that the second terminal device is to initiate the sidelink unicast establishment or SLRB setup first: transmitting, to the second terminal device, a sidelink message for sidelink unicast establishment or SLRB setup for a unidirectional link from the first terminal device to the second terminal device, after a unidirectional link from the second terminal device to the first terminal device has been established.

In an embodiment, the network node may be a gNB a SMF node, or a PCF node.

In an embodiment, the indication may be received from the gNB via: RRC signaling, MAC CE or L1 signaling; the indication may be received from the SMF node or the PCF node via: NAS RRC signaling; or the indication may be forwarded to the second terminal device via: PC5-RRC signaling, PC5-S discovery signaling, MAC CE, or L1 signaling.

The units 1510-1520 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 7.

Figure 16:
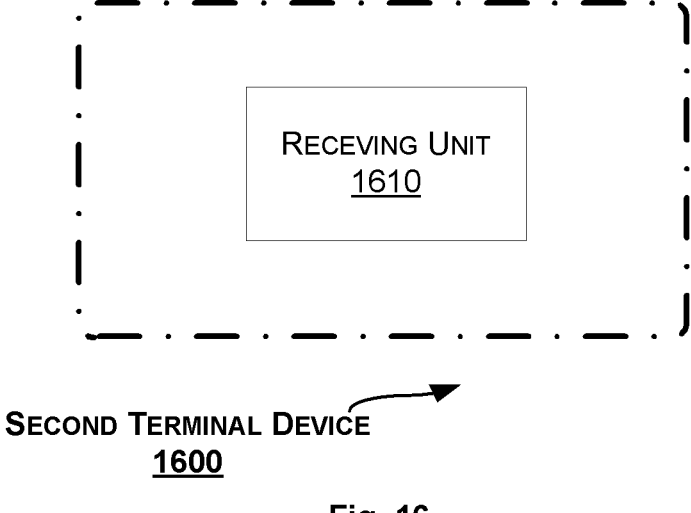
FIG. 16 is a block diagram of a second terminal device according to another embodiment of the present disclosure.

Correspondingly to the method 800 as described above, a second terminal device is provided. FIG. 16 is a block diagram of a second terminal device 1600 according to an embodiment of the present disclosure.

The second terminal device 1600 may be operative to perform the method 800 as described above in connection with FIG. 8. The second terminal device 1600 may include a receiving unit 1610 configured to receive, from a first terminal device, an indication indicating which of the first terminal device and the second terminal device is to initiate sidelink unicast establishment or SLRB setup first for a bidirectional service between the first terminal device and the second terminal device.

In an embodiment, the method may further include, when the indication indicates that the second terminal device is to initiate the sidelink unicast establishment or SLRB setup first: transmitting, to the first terminal device, a sidelink message for sidelink unicast establishment or SLRB setup for a unidirectional link from the second terminal device to the first terminal device.

In an embodiment, the method may further include, when the indication indicates that the first terminal device is to initiate the sidelink unicast establishment or SLRB setup first: transmitting, to the first terminal device, a sidelink message for sidelink unicast establishment or SLRB setup for a unidirectional link from the second terminal device to the first terminal device, after a unidirectional link from the first terminal device to the second terminal device has been established.

In an embodiment, indication may be received via: PC5-RRC signaling, PC5-S discovery signaling, MAC CE or L1 signaling.

The unit 1610 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 8.

Figure 17:
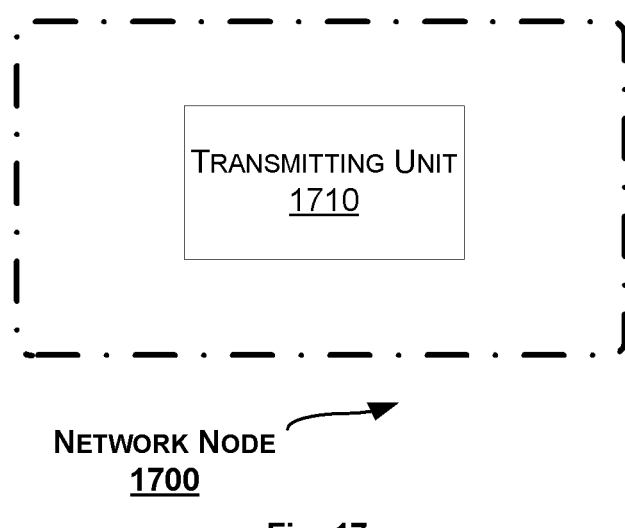
FIG. 17 is a block diagram of a network node according to an embodiment of the present disclosure.

Correspondingly to the method 900 as described above, a network node is provided. FIG. 17 is a block diagram of a network node 1700 according to an embodiment of the present disclosure.

The network node 1700 may be operative to perform the method 900 as described above in connection with FIG. 9. The network node 1700 may include a transmitting unit 1710 configured to transmit, to a first terminal device, an indication indicating which of the first terminal device and a second terminal device is to initiate sidelink unicast establishment or SLRB setup first for a bidirectional service between the first terminal device and the second terminal device.

In an embodiment, the network node may be a gNB a SMF node, or a PCF node.

In an embodiment, when the network node is the gNB, the configuration may be transmitted via: RRC signaling, MAC CE or L1 signaling; or when the network node is the SMF node or the PCF node, the configuration may be transmitted via: NAS RRC signaling.

The unit 1710 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 9.

Figure 18:
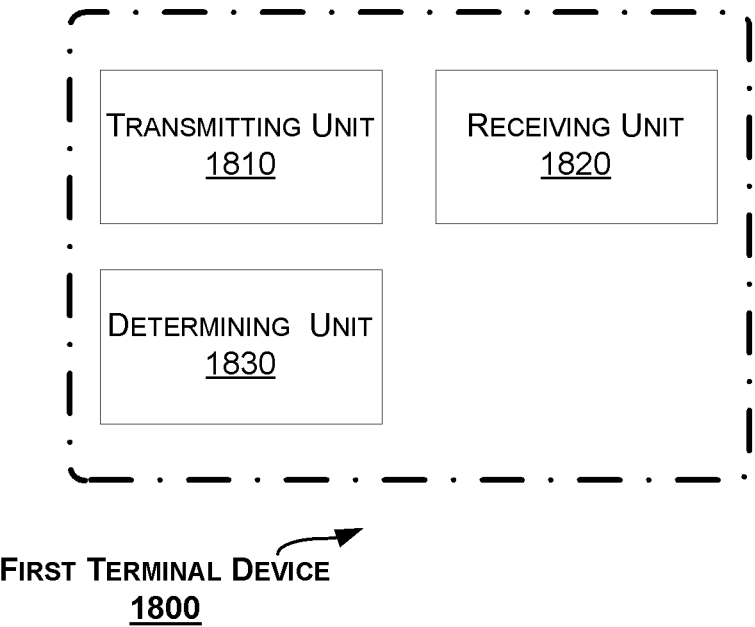
FIG. 18 is a block diagram of a first terminal device according to still yet another embodiment of the present disclosure.

Correspondingly to the method 1000 as described above, a first terminal device is provided. FIG. 18 is a block diagram of a first terminal device 1800 according to an embodiment of the present disclosure.

The first terminal device 1800 may be operative to perform the method 1000 as described above in connection with FIG. 10. The first terminal device 1800 may include a transmitting unit 1810 configured to transmit, to a second terminal device, a first sidelink message for sidelink unicast establishment or SLRB setup for a unidirectional link from the first terminal device to the second terminal device. The first terminal device 1800 further include a receiving unit 1820 configured to receive, from the second terminal device, a second sidelink message for sidelink unicast establishment or SLRB setup for a unidirectional link from the second terminal device to the first terminal device. The first terminal device 1800 further include a determining unit 1830 configured to determine which of the first sidelink message and the second sidelink message is to be prioritized.

In an embodiment, the first sidelink message may contain a first timestamp and the second sidelink message contains a second timestamp, and said determining may include determining to prioritize the first sidelink message when the first timestamp is earlier than the second timestamp, or to prioritize the second sidelink message when the second timestamp is earlier than the first timestamp.

In an embodiment, said determining may include determining to prioritize the first sidelink message or the second sidelink message based on a first weight or priority associated with the first terminal device and a second weight or priority associated with the second terminal device.

In an embodiment, the first weight or priority may be a first fixed value configured for the first terminal device, and the second weight or priority may be a second fixed value configured for the second terminal device.

In an embodiment, the first fixed value may be a User Equipment (UE) ID of the first terminal device, and the second fixed value may be a UE ID of the second terminal device.

In an embodiment, the first weight or priority or the second weight or priority may be dependent on one or more of the following associated with the first or second terminal device: a UE category, a UE capability, a battery life, a type of a current service, a priority of the current service, a Quality of Service, QoS, requirement for the current service, or a geographical location.

In an embodiment, the first sidelink message may be transmitted, and/or the second sidelink message may be received via: PC5-RRC signaling, PC5-S discovery signaling, MAC CE or L1 signaling.

The units 1810-1830 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 10.

Figure 19:
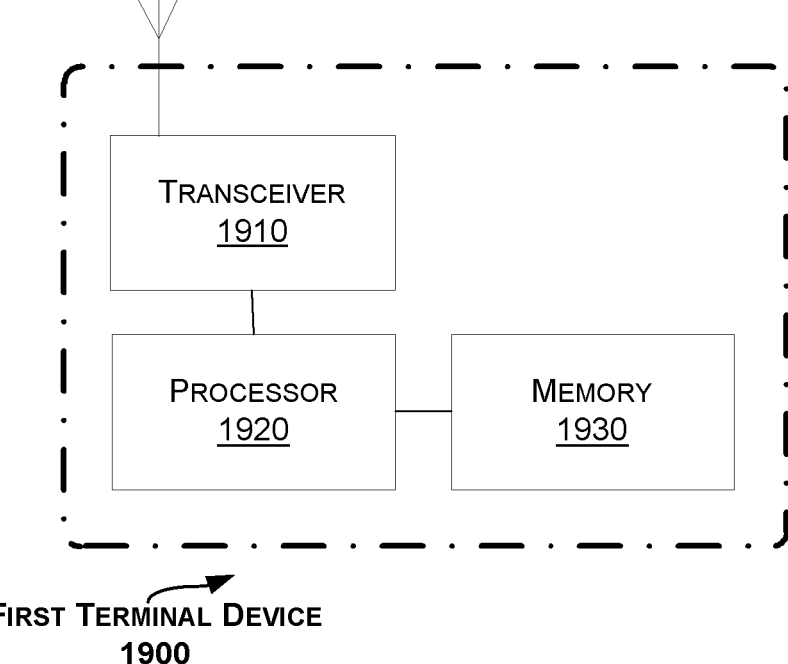
FIG. 19 is a block diagram of a first terminal device according to a further embodiment of the present disclosure.

FIG. 19 is a block diagram of a first terminal device 1900 according to another embodiment of the present disclosure.

The first terminal device 1900 includes a transceiver 1910, a processor 1920 and a memory 1930. The memory 1930 may contain instructions executable by the processor 1920 whereby the first terminal device 1900 is operative to perform the actions, e.g., of the procedure described earlier in conjunction with FIG. 3. Particularly, the memory 1930 contains instructions executable by the processor 1920 whereby the first terminal device 1900 is operative to: transmit, to a second terminal device, a first sidelink message containing a first Discontinuous Reception (DRX) configuration; receive, from the second terminal device, a second sidelink message containing a second DRX configuration; and delay transmission of a second response to the second sidelink message to the second terminal device until a first response to the first sidelink message is received from the second terminal device, or until a timer expires.

In an embodiment, the first response may contain a suggested change to the first DRX configuration, and the method may further include: updating the first DRX configuration based on the suggested change to the first DRX configuration.

In an embodiment, the updated first DRX configuration and the second DRX configuration may contain respective on-duration timers and/or inactivity timers that are configured separately, and one or more DRX parameters that are configured to be common to the updated first DRX configuration and the second DRX configuration.

In an embodiment, the one or more DRX parameters may include a slot offset, a retransmission timer, a long cycle start offset, a short cycle, a short cycle timer, and/or a Hybrid Automatic Repeat request (HARQ) Round-Trip Time (RTT) timer.

In an embodiment, the method may further include: transmitting the second response to the second terminal device, the second response containing a suggested change to the second DRX configuration.

In an embodiment, the suggested change to the second DRX configuration may be determined based on the updated first DRX configuration.

In an embodiment, the timer may be set to a different value from a corresponding timer provided at the second terminal device.

In an embodiment, each of the first DRX configuration and the second DRX configuration may be for a bidirectional link between the first terminal device and the second terminal device, or the first DRX configuration may be for a unidirectional link from the first terminal device to the second terminal device, and the second DRX configuration is for a unidirectional link from the second terminal device to the first terminal device.

In an embodiment, the first sidelink message may be for sidelink unicast establishment or Sidelink Radio Bearer (SLRB) setup for a unidirectional link from the first terminal device to the second terminal device, and the second sidelink message may be for sidelink unicast establishment or SLRB setup for a unidirectional link from the second terminal device to the first terminal device.

In an embodiment, the first sidelink message and the second sidelink message may be associated with a same type of service or with different types of services.

In an embodiment, the first sidelink message and/or the second response may be transmitted, and/or the second sidelink message and/or the first response may be received, via: PC5-Radio Resource Control (RRC) signaling, PC5-Signaling (PC5-S) discovery signaling, Medium Access Control (MAC) Control Element (CE), or Layer 1 (L1), signaling.

In an embodiment, the method may further include: receiving, from a network node or another terminal device controlling the first terminal device and/or the second terminal device, a configuration for the delaying.

In an embodiment, the network node may be a next generation Node B (gNB), a Session Management Function (SMF) node, or a Policy Control Function (PCF) node.

In an embodiment, the configuration may be received from the gNB via: RRC signaling, MAC CE or L1 signaling; the configuration may be received from the SMF node or the PCF node via: Non-Access Stratum (NAS) RRC signaling; or the configuration may be received from the other terminal device via: PC5-RRC signaling, PC5-S discovery signaling, MAC CE, or L1 signaling.

Alternatively, the memory 1930 may contain instructions executable by the processor 1920 whereby the first terminal device 1900 is operative to perform the actions, e.g., of the procedure described earlier in conjunction with FIG. 4. Particularly, the memory 1930 contains instructions executable by the processor 1920 whereby the first terminal device 1900 is operative to: transmit, to a second terminal device, a first sidelink message containing a first DRX configuration; receive, from the second terminal device, a second sidelink message containing a second DRX configuration; and transmit a second response to the second sidelink message to the second terminal device without waiting for a first response to the first sidelink message from the second terminal device.

In an embodiment, the second response may contain an Acknowledgement (ACK) or success information indicating that the second DRX configuration is applicable to the first terminal device, or a Negative Acknowledgement (NACK) or failure information indicating that the second DRX configuration is not applicable to the first terminal device.

In an embodiment, the second response may further contain a suggested change to the second DRX configuration.

In an embodiment, the suggested change to the second DRX configuration may be determined based on the first DRX configuration.

In an embodiment, the second response may be a failure response.

In an embodiment, the second response may contain a failure cause associated with a race condition in DRX configuration negotiation between the first terminal device and the second terminal device, or with a misalignment between the first DRX configuration and the second DRX configuration.

In an embodiment, the method may further include: receiving the first response from the second terminal device; receiving a third sidelink message from the second terminal device, as a result of failure of the second sidelink message; and transmitting a third response to the third sidelink message to the second terminal device.

In an embodiment, the second response may further contain an indication of expected time at which the second terminal device is to transmit the third sidelink message.

In an embodiment, each of the first DRX configuration and the second DRX configuration may be for a bidirectional link between the first terminal device and the second terminal device, or the first DRX configuration may be for a unidirectional link from the first terminal device to the second terminal device and the second DRX configuration is for a unidirectional link from the second terminal device to the first terminal device.

In an embodiment, the first sidelink message may be for sidelink unicast establishment or SLRB setup for a unidirectional link from the first terminal device to the second terminal device, and the second sidelink message may be for sidelink unicast establishment or SLRB setup for a unidirectional link from the second terminal device to the first terminal device.

In an embodiment, the first sidelink message and the second sidelink message may be associated with a same type of service or with different types of services.

In an embodiment, the first sidelink message and/or the second response may be transmitted, and/or the second sidelink message and/or the first response may be received, via: PC5-RRC signaling, PC5-S discovery signaling, MAC CE or L1 signaling.

In an embodiment, the method may further include: receiving, from a network node or another terminal device controlling the first terminal device and/or the second terminal device, a configuration for transmitting the second response without waiting for the first response.

In an embodiment, the network node may be a gNB a SMF node, or a PCF node.

In an embodiment, the configuration may be received from the gNB via: RRC signaling, MAC CE or L1 signaling; the configuration may be received from the SMF node or the PCF node via: NAS RRC signaling; or the configuration may be received from the other terminal device via: PC5-RRC signaling, PC5-S discovery signaling, MAC CE, or L1 signaling.

Alternatively, the memory 1930 may contain instructions executable by the processor 1920 whereby the first terminal device 1900 is operative to perform the actions, e.g., of the procedure described earlier in conjunction with FIG. 6. Particularly, the memory 1930 contains instructions executable by the processor 1920 whereby the first terminal device 1900 is operative to: determine that a condition for initiating sidelink unicast establishment or SLRB setup is met; and delay transmission of a sidelink message for sidelink unicast establishment or SLRB setup to a second terminal device by a random time length.

In an embodiment, the condition may include traffic or data being available for transmission to the second terminal device.

In an embodiment, the random time length may follow a random variable distribution.

In an embodiment, the sidelink message may be transmitted via: PC5-RRC signaling, PC5-S discovery signaling, MAC CE or L1 signaling.

Alternatively, the memory 1930 may contain instructions executable by the processor 1920 whereby the first terminal device 1900 is operative to perform the actions, e.g., of the procedure described earlier in conjunction with FIG. 7. Particularly, the memory 1930 contains instructions executable by the processor 1920 whereby the first terminal device 1900 is operative to: receive, from a network node, an indication indicating which of the first terminal device and a second terminal device is to initiate sidelink unicast establishment or SLRB setup first for a bidirectional service between the first terminal device and the second terminal device; and forward the indication to the second terminal device.

In an embodiment, the method may further include, when the indication indicates that the first terminal device is to initiate the sidelink unicast establishment or SLRB setup first: transmitting, to the second terminal device, a sidelink message for sidelink unicast establishment or SLRB setup for a unidirectional link from the first terminal device to the second terminal device.

In an embodiment, the method may further include, when the indication indicates that the second terminal device is to initiate the sidelink unicast establishment or SLRB setup first: transmitting, to the second terminal device, a sidelink message for sidelink unicast establishment or SLRB setup for a unidirectional link from the first terminal device to the second terminal device, after a unidirectional link from the second terminal device to the first terminal device has been established.

In an embodiment, the network node may be a gNB a SMF node, or a PCF node.

In an embodiment, the indication may be received from the gNB via: RRC signaling, MAC CE or L1 signaling; the indication may be received from the SMF node or the PCF node via: NAS RRC signaling; or the indication may be forwarded to the second terminal device via: PC5-RRC signaling, PC5-S discovery signaling, MAC CE, or L1 signaling.

Alternatively, the memory 1930 may contain instructions executable by the processor 1920 whereby the first terminal device 1900 is operative to perform the actions, e.g., of the procedure described earlier in conjunction with FIG. 10. Particularly, the memory 1930 contains instructions executable by the processor 1920 whereby the first terminal device 1900 is operative to: transmit, to a second terminal device, a first sidelink message for sidelink unicast establishment or SLRB setup for a unidirectional link from the first terminal device to the second terminal device; receive, from the second terminal device, a second sidelink message for sidelink unicast establishment or SLRB setup for a unidirectional link from the second terminal device to the first terminal device; and determine which of the first sidelink message and the second sidelink message is to be prioritized.

In an embodiment, the first sidelink message may contain a first timestamp and the second sidelink message contains a second timestamp, and said determining may include determining to prioritize the first sidelink message when the first timestamp is earlier than the second timestamp, or to prioritize the second sidelink message when the second timestamp is earlier than the first timestamp.

In an embodiment, said determining may include determining to prioritize the first sidelink message or the second sidelink message based on a first weight or priority associated with the first terminal device and a second weight or priority associated with the second terminal device.

In an embodiment, the first weight or priority may be a first fixed value configured for the first terminal device, and the second weight or priority may be a second fixed value configured for the second terminal device.

In an embodiment, the first fixed value may be a User Equipment (UE) ID of the first terminal device, and the second fixed value may be a UE ID of the second terminal device.

In an embodiment, the first weight or priority or the second weight or priority may be dependent on one or more of the following associated with the first or second terminal device: a UE category, a UE capability, a battery life, a type of a current service, a priority of the current service, a Quality of Service, QoS, requirement for the current service, or a geographical location.

In an embodiment, the first sidelink message may be transmitted, and/or the second sidelink message may be received via: PC5-RRC signaling, PC5-S discovery signaling, MAC CE or L1 signaling.

Figure 20:
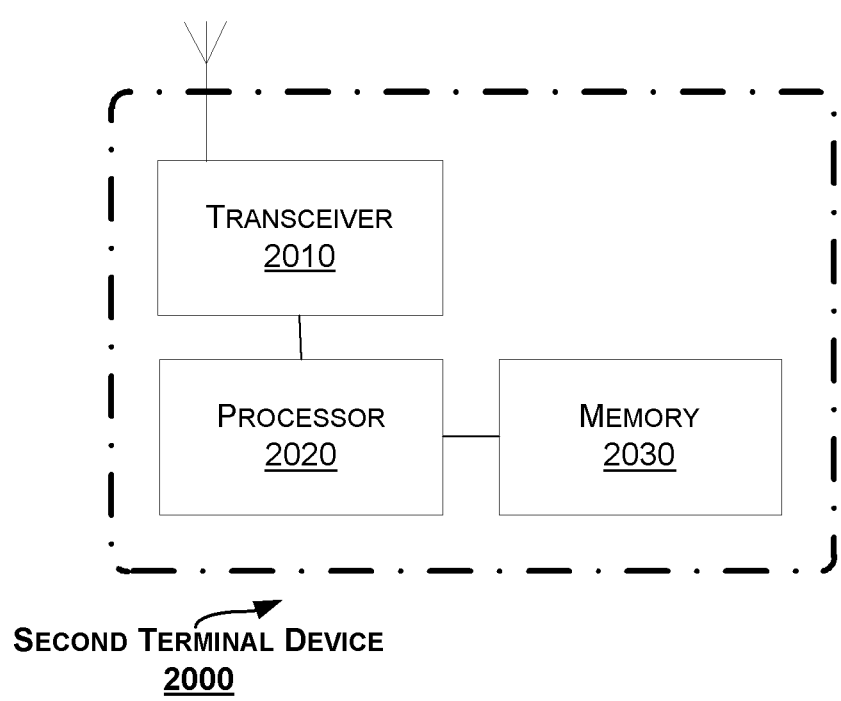
FIG. 20 is a block diagram of a second terminal device according to a further embodiment of the present disclosure.

FIG. 20 is a block diagram of a second terminal device 2000 according to another embodiment of the present disclosure.

The second terminal device 2000 includes a transceiver 2010, a processor 2020 and a memory 2030. The memory 2030 may contain instructions executable by the processor 2020 whereby the second terminal device 2000 is operative to perform the actions, e.g., of the procedure described earlier in conjunction with FIG. 5. Particularly, the memory 2030 contains instructions executable by the processor 2020 whereby the second terminal device 2000 is operative to: receive, from a first terminal device, a first sidelink message containing a first DRX configuration; transmit, to the first terminal device, a second sidelink message containing a second DRX configuration, before transmitting a first response to the first sidelink message to the first terminal device; and receive a second response to the second sidelink message from the first terminal device.

In an embodiment, the second response may contain an Acknowledgement (ACK) or success information indicating that the second DRX configuration is applicable to the first terminal device, or a NACK or failure information indicating that the second DRX configuration is not applicable to the first terminal device.

In an embodiment, the second response may further contain a suggested change to the second DRX configuration.

In an embodiment, the suggested change to the second DRX configuration may be determined based on the first DRX configuration.

In an embodiment, the second response may be a failure response.

In an embodiment, the second response may contain a failure cause associated with a race condition in DRX configuration negotiation between the first terminal device and the second terminal device, or with a misalignment between the first DRX configuration and the second DRX configuration.

In an embodiment, the method may further include: transmitting the first response to the first terminal device; transmitting a third sidelink message to the first terminal device, as a result of failure of the second sidelink message; and receiving a third response to the third sidelink message from the first terminal device.

In an embodiment, the second response may further contain an indication of expected time at which the second terminal device is to transmit the third sidelink message.

In an embodiment, each of the first DRX configuration and the second DRX configuration may be for a bidirectional link between the first terminal device and the second terminal device, or the first DRX configuration may be for a unidirectional link from the first terminal device to the second terminal device and the second DRX configuration is for a unidirectional link from the second terminal device to the first terminal device.

In an embodiment, the first sidelink message may be for sidelink unicast establishment or SLRB setup for a unidirectional link from the first terminal device to the second terminal device, and the second sidelink message may be for sidelink unicast establishment or SLRB setup for a unidirectional link from the second terminal device to the first terminal device.

In an embodiment, the first sidelink message and the second sidelink message may be associated with a same type of service or with different types of services.

In an embodiment, the first sidelink message and/or the second response may be received, and/or the second sidelink message and/or the first response may be transmitted via: PC5-RRC signaling, PC5-S discovery signaling, MAC CE or L1 signaling.

Alternatively, the memory 2030 may contain instructions executable by the processor 2020 whereby the second terminal device 2000 is operative to perform the actions, e.g., of the procedure described earlier in conjunction with FIG. 8. Particularly, the memory 2030 contains instructions executable by the processor 2020 whereby the second terminal device 2000 is operative to: receive, from a first terminal device, an indication indicating which of the first terminal device and the second terminal device is to initiate sidelink unicast establishment or SLRB setup first for a bidirectional service between the first terminal device and the second terminal device.

In an embodiment, the method may further include, when the indication indicates that the second terminal device is to initiate the sidelink unicast establishment or SLRB setup first: transmitting, to the first terminal device, a sidelink message for sidelink unicast establishment or SLRB setup for a unidirectional link from the second terminal device to the first terminal device.

In an embodiment, the method may further include, when the indication indicates that the first terminal device is to initiate the sidelink unicast establishment or SLRB setup first: transmitting, to the first terminal device, a sidelink message for sidelink unicast establishment or SLRB setup for a unidirectional link from the second terminal device to the first terminal device, after a unidirectional link from the first terminal device to the second terminal device has been established.

In an embodiment, indication may be received via: PC5-RRC signaling, PC5-S discovery signaling, MAC CE or L1 signaling.

Figure 21:
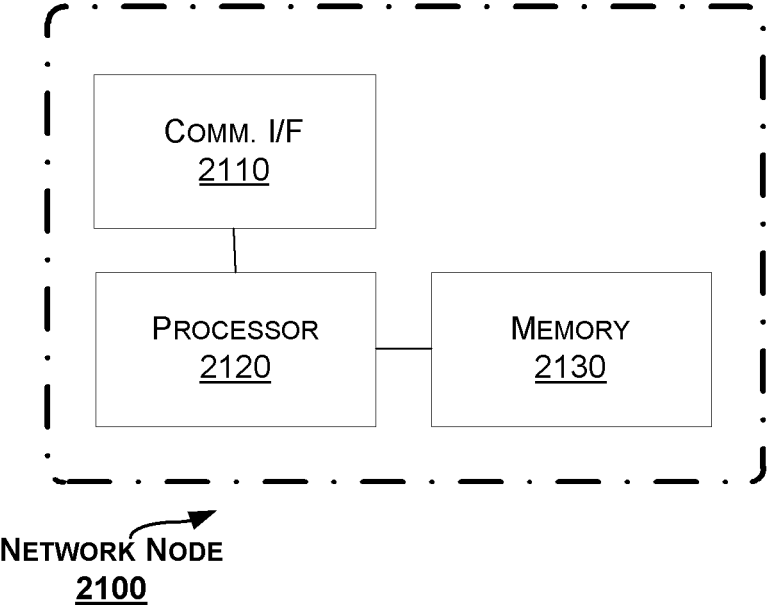
FIG. 21 is a block diagram of a network node according to a further embodiment of the present disclosure.

FIG. 21 is a block diagram of a network node 2100 according to another embodiment of the present disclosure.

The network node 2100 includes a communication interface 2110, a processor 2120 and a memory 2130. The memory 2130 can contain instructions executable by the processor 2120 whereby the network node 2100 is operative to perform the actions, e.g., of the process described earlier in conjunction with FIG. 9. Particularly, the memory 2130 can contain instructions executable by the processor 2120 whereby the network node 2100 is operative to: transmit, to a first terminal device, an indication indicating which of the first terminal device and a second terminal device is to initiate sidelink unicast establishment or SLRB setup first for a bidirectional service between the first terminal device and the second terminal device.

In an embodiment, the network node may be a gNB a SMF node, or a PCF node.

In an embodiment, when the network node is the gNB, the configuration may be transmitted via: RRC signaling, MAC CE or L1 signaling; or when the network node is the SMF node or the PCF node, the configuration may be transmitted via: NAS RRC signaling.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1920 causes the first terminal device 1900 to perform the actions, e.g., of the procedure described earlier in conjunction with FIGS. 3, 4, 6, 7, and 10; code/computer readable instructions, which when executed by the processor 2020 causes the second terminal device 2000 to perform the actions, e.g., of the procedure described earlier in conjunction with FIGS. 5 and 8; or code/computer readable instructions, which when executed by the processor 2120 causes the network node 2100 to perform the actions, e.g., of the procedure described earlier in conjunction with FIG. 9.

The computer program product may be configured as a computer program code structured in computer program modules. The computer program modules could essentially perform the actions of the flow illustrated in FIG. 3, 4, 5, 6, 7, 8, 9, or 10.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random Access Memory (RAM), a Read-Only Memory (ROM), or an EEPROM, and the computer program modules described above could in alternative embodiments be distributed on different computer program products in the form of memories.

Figure 22:
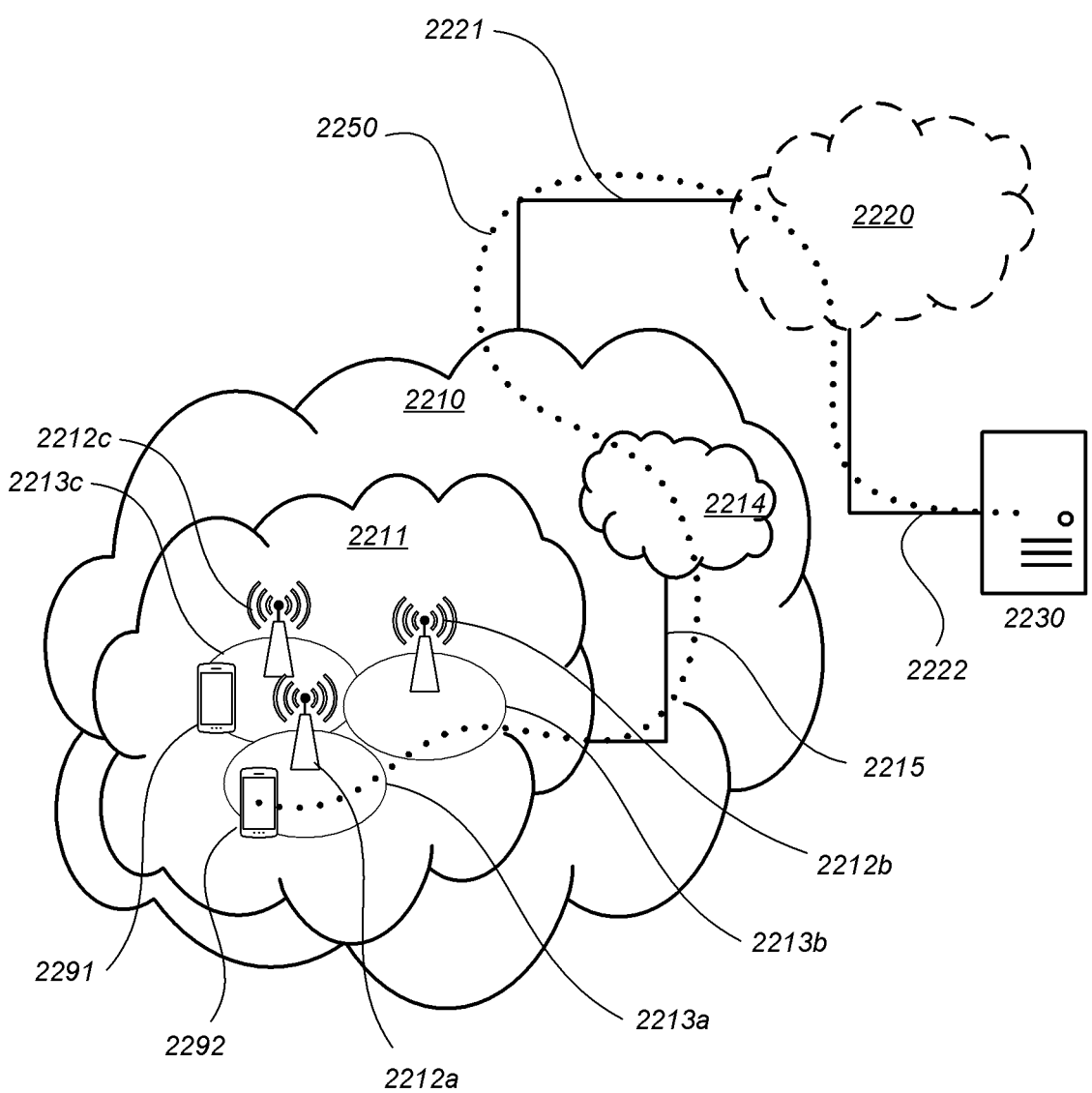
FIG. 22 schematically illustrates a telecommunication network connected via an intermediate network to a host computer.

With reference to FIG. 22, in accordance with an embodiment, a communication system includes a telecommunication network 2210, such as a 3GPP-type cellular network, which comprises an access network 2211, such as a radio access network, and a core network 2214. The access network 2211 comprises a plurality of base stations 2212a, 2212b, 2212c, such as NBs, eNBs, gNBs or other types of wireless access points, each defining a corresponding coverage area 2213a, 2213b, 2213c. Each base station 2212a, 2212b, 2212c is connectable to the core network 2214 over a wired or wireless connection 2215. A first UE 2291 located in a coverage area 2213c is configured to wirelessly connect to, or be paged by, the corresponding base station 2212c. A second UE 2292 in a coverage area 2213a is wirelessly connectable to the corresponding base station 2212a. While a plurality of UEs 2291, 2292 are illustrated in this example, the disclosed embodiments are equally applicable to a situation where a sole UE is in the coverage area or where a sole UE is connecting to the corresponding base station 2212.

The telecommunication network 2210 is itself connected to a host computer 2230, which may be embodied in the hardware and/or software of a standalone server, a cloud-implemented server, a distributed server or as processing resources in a server farm. The host computer 2230 may be under the ownership or control of a service provider, or may be operated by the service provider or on behalf of the service provider. Connections 2221 and 2222 between the telecommunication network 2210 and the host computer 2230 may extend directly from the core network 2214 to the host computer 2230 or may go via an optional intermediate network 2220. An intermediate network 2220 may be one of, or a combination of more than one of, a public, private or hosted network; the intermediate network 2220, if any, may be a backbone network or the Internet; in particular, the intermediate network 2220 may comprise two or more sub-networks (not shown).

The communication system of FIG. 22 as a whole enables connectivity between the connected UEs 2291, 2292 and the host computer 2230. The connectivity may be described as an over-the-top (OTT) connection 2250. The host computer 2230 and the connected UEs 2291, 2292 are configured to communicate data and/or signaling via the OTT connection 2250, using the access network 2211, the core network 2214, any intermediate network 2220 and possible further infra-structure (not shown) as intermediaries. The OTT connec-tion 2250 may be transparent in the sense that the partici-pating communication devices through which the OTT connection 2250 passes are unaware of routing of uplink and downlink communications. For example, the base station 2212 may not or need not be informed about the past routing of an incoming downlink communication with data origi-nating from the host computer 2230 to be forwarded (e.g., handed over) to a connected UE 2291. Similarly, the base station 2212 need not be aware of the future routing of an outgoing uplink communication originating from the UE 2291 towards the host computer 2230.

Example implementations, in accordance with an embodi-ment, of the UE, base station and host computer discussed in the preceding paragraphs will now be described with reference to FIG. 23. In a communication system 2300, a host computer 2310 comprises hardware 2315 including a communication interface 2316 configured to set up and maintain a wired or wireless connection with an interface of a different communication device of the communication system 2300. The host computer 2310 further comprises a processing circuitry 2318, which may have storage and/or processing capabilities. In particular, the processing cir-cuitry 2318 may comprise one or more programmable processors, application-specific integrated circuits, field pro-grammable gate arrays or combinations of these (not shown) adapted to execute instructions. The host computer 2310 further comprises software 2311, which is stored in or accessible by the host computer 2310 and executable by the processing circuitry 2318. The software 2311 includes a host application 2312. The host application 2312 may be oper-able to provide a service to a remote user, such as UE 2330 connecting via an OTT connection 2350 terminating at the UE 2330 and the host computer 2310. In providing the service to the remote user, the host application 2312 may provide user data which is transmitted using the OTT connection 2350.

The communication system 2300 further includes a base station 2320 provided in a telecommunication system and comprising hardware 2325 enabling it to communicate with the host computer 2310 and with the UE 2330. The hardware 2325 may include a communication interface 2326 for setting up and maintaining a wired or wireless connection with an interface of a different communication device of the communication system 2300, as well as a radio interface 2327 for setting up and maintaining at least a wireless connection 2370 with the UE 2330 located in a coverage area (not shown in FIG. 23) served by the base station 2320. The communication interface 2326 may be configured to facilitate a connection 2360 to the host computer 2310. The connection 2360 may be direct or it may pass through a core network (not shown in FIG. 23) of the telecommunication system and/or through one or more intermediate networks outside the telecommunication system. In the embodiment shown, the hardware 2325 of the base station 2320 further includes a processing circuitry 2328, which may comprise one or more programmable processors, application-specific integrated circuits, field programmable gate arrays or com-binations of these (not shown) adapted to execute instruc-tions. The base station 2320 further has software 2321 stored internally or accessible via an external connection.

The communication system 2300 further includes the UE 2330 already referred to. Its hardware 2335 may include a radio interface 2337 configured to set up and maintain a wireless connection 2370 with a base station serving a coverage area in which the UE 2330 is currently located. The hardware 2335 of the UE 2330 further includes a processing circuitry 2338, which may comprise one or more program-mable processors, application-specific integrated circuits, field programmable gate arrays or combinations of these (not shown) adapted to execute instructions. The UE 2330 further comprises software 2331, which is stored in or accessible by the UE 2330 and executable by the processing circuitry 2338. The software 2331 includes a client appli-cation 2332. The client application 2332 may be operable to provide a service to a human or non-human user via the UE 2330, with the support of the host computer 2310. In the host computer 2310, an executing host application 2312 may communicate with the executing client application 2332 via the OTT connection 2350 terminating at the UE 2330 and the host computer 2310. In providing the service to the user, the client application 2332 may receive request data from the host application 2312 and provide user data in response to the request data. The OTT connection 2350 may transfer both the request data and the user data. The client application 2332 may interact with the user to generate the user data that it provides.

Figure 23:
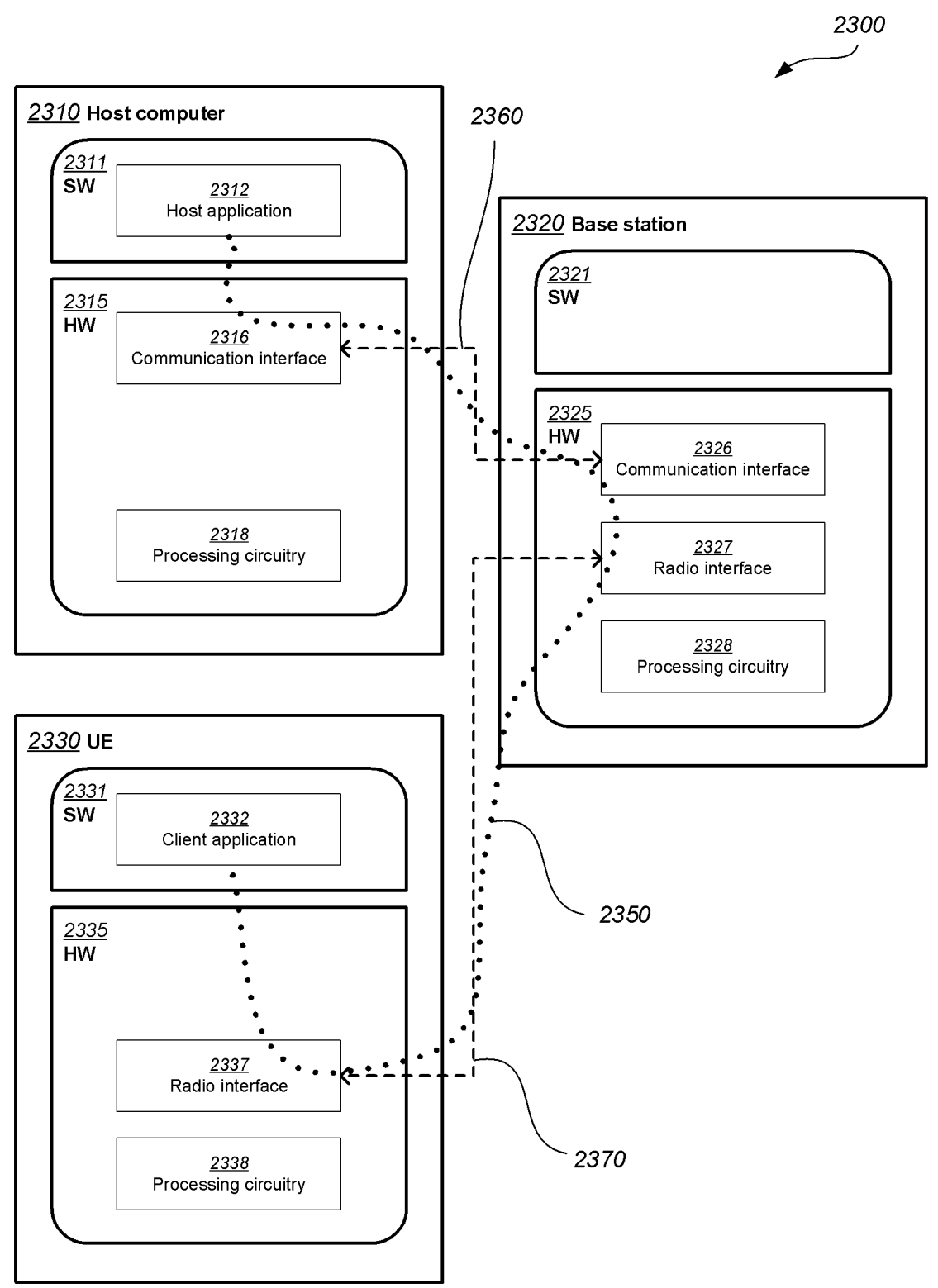
FIG. 23 is a generalized block diagram of a host computer communicating via a base station with a user equipment over a partially wireless connection.

It is noted that the host computer 2310, the base station 2320 and the UE 2330 illustrated in FIG. 23 may be similar or identical to the host computer 1930, one of base stations 1912a, 1912b, 1912c and one of UEs 1991, 1992 of FIG. 22, respectively. This is to say, the inner workings of these entities may be as shown in FIG. 23 and independently, the surrounding network topology may be that of FIG. 22.

In FIG. 23, the OTT connection 2350 has been drawn abstractly to illustrate the communication between the host computer 2310 and the UE 2330 via the base station 2320, without explicit reference to any intermediary devices and the precise routing of messages via these devices. Network infrastructure may determine the routing, which it may be configured to hide from the UE 2330 or from the service provider operating the host computer 2310, or both. While the OTT connection 2350 is active, the network infrastruc-ture may further take decisions by which it dynamically changes the routing (e.g., on the basis of load balancing consideration or reconfiguration of the network).

Wireless connection 2370 between the UE 2330 and the base station 2320 is in accordance with the teachings of the embodiments described throughout this disclosure. One or more of the various embodiments improve the performance of OTT services provided to the UE 2330 using the OTT connection 2350, in which the wireless connection 2370 forms the last segment. More precisely, the teachings of these embodiments may improve data rate and latency, and thereby provide benefits such as reduced user waiting time.

A measurement procedure may be provided for the pur-pose of monitoring data rate, latency and other factors on which the one or more embodiments improve. There may further be an optional network functionality for reconfiguring the OTT connection 2350 between the host computer 2310 and the UE 2330, in response to variations in the measurement results. The measurement procedure and/or the network functionality for reconfiguring the OTT connection 2350 may be implemented in software 2311 and hardware 2315 of the host computer 2310 or in software 2331 and hardware 2335 of the UE 2330, or both. In embodiments, sensors (not shown) may be deployed in or in association with communication devices through which the OTT connection 2350 passes; the sensors may participate in the measurement procedure by supplying values of the monitored quantities exemplified above, or supplying values of other physical quantities from which the software 2311, 2331 may compute or estimate the monitored quantities. The reconfiguring of the OTT connection 2350 may include message format, retransmission settings, preferred routing etc.; the reconfiguring need not affect the base station 2320, and it may be unknown or imperceptible to the base station 2320. Such procedures and functionalities may be known and practiced in the art. In certain embodiments, measurements may involve proprietary UE signaling facilitating the host computer 2310's measurements of throughput, propagation times, latency and the like. The measurements may be implemented in that the software 2311 and 2331 causes messages to be transmitted, in particular empty or 'dummy' messages, using the OTT connection 2350 while it monitors propagation times, errors etc.

FIG. 24 is a flowchart illustrating a method implemented in a communication system, in accordance with an embodiment. The communication system includes a host computer, a base station and a UE which may be those described with reference to FIG. 22 and FIG. 23. For simplicity of the present disclosure, only drawing references to FIG. 24 will be included in this section. In step 2410, the host computer provides user data. In substep 2411 (which may be optional) of step 2410, the host computer provides the user data by executing a host application. In step 2420, the host computer initiates a transmission carrying the user data to the UE. In step 2430 (which may be optional), the base station transmits to the UE the user data which was carried in the transmission that the host computer initiated, in accordance with the teachings of the embodiments described throughout this disclosure. In step 2440 (which may also be optional), the UE executes a client application associated with the host application executed by the host computer.

FIG. 25 is a flowchart illustrating a method implemented in a communication system, in accordance with an embodiment. The communication system includes a host computer, a base station and a UE which may be those described with reference to FIG. 22 and FIG. 23. For simplicity of the present disclosure, only drawing references to FIG. 25 will be included in this section. In step 2510 of the method, the host computer provides user data. In an optional substep (not shown) the host computer provides the user data by executing a host application. In step 2520, the host computer initiates a transmission carrying the user data to the UE. The transmission may pass via the base station, in accordance with the teachings of the embodiments described throughout this disclosure. In step 2530 (which may be optional), the UE receives the user data carried in the transmission.

Figures 26, 27:
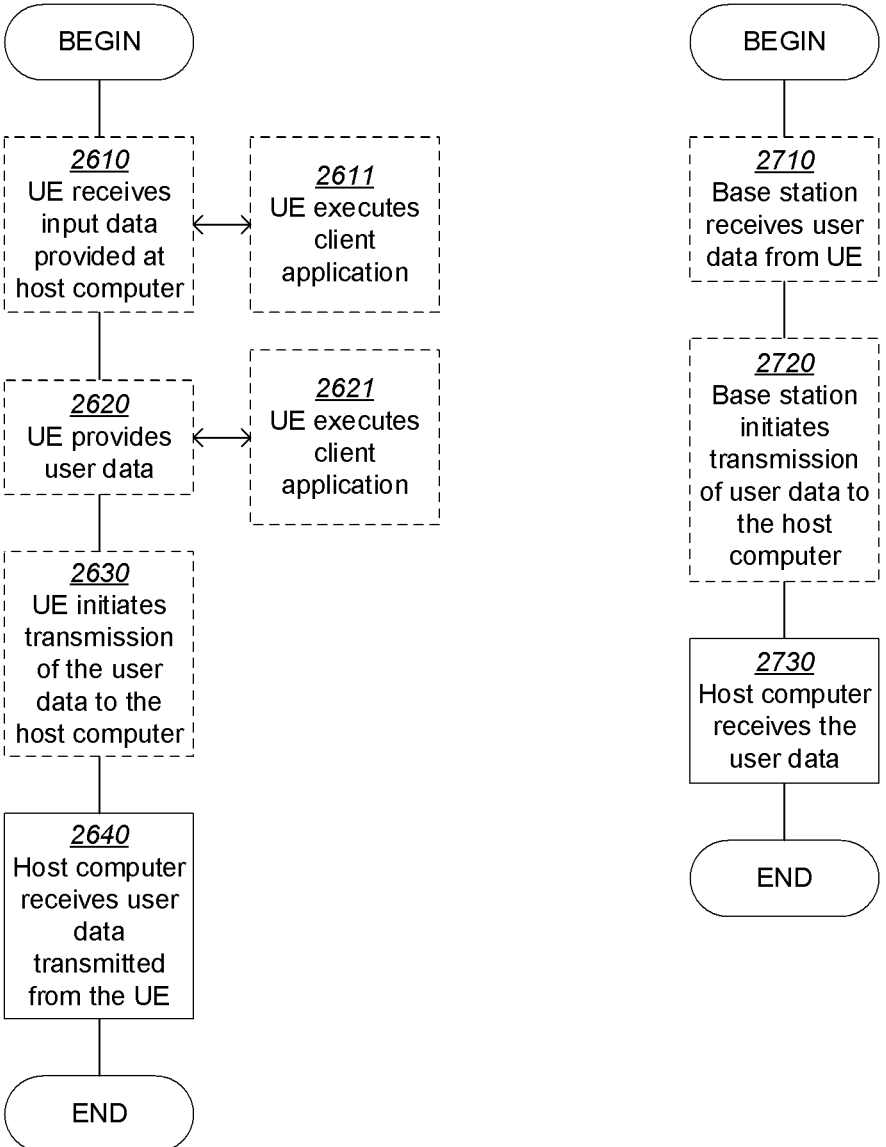

FIG. 26 is a flowchart illustrating a method implemented in a communication system, in accordance with an embodiment. The communication system includes a host computer, a base station and a UE which may be those described with reference to FIG. 22 and FIG. 23. For simplicity of the present disclosure, only drawing references to FIG. 26 will be included in this section. In step 2610 (which may be optional), the UE receives input data provided by the host computer.

Additionally or alternatively, in step 2620, the UE provides user data. In substep 2621 (which may be optional) of step 2620, the UE provides the user data by executing a client application. In substep 2611 (which may be optional) of step 2610, the UE executes a client application which provides the user data in reaction to the received input data provided by the host computer. In providing the user data, the executed client application may further consider user input received from the user. Regardless of the specific manner in which the user data was provided, the UE initiates, in substep 2630 (which may be optional), transmission of the user data to the host computer. In step 2640 of the method, the host computer receives the user data transmitted from the UE, in accordance with the teachings of the embodiments described throughout this disclosure.

FIG. 27 is a flowchart illustrating a method implemented in a communication system, in accordance with an embodiment. The communication system includes a host computer, a base station and a UE which may be those described with reference to FIG. 22 and FIG. 23. For simplicity of the present disclosure, only drawing references to FIG. 27 will be included in this section. In step 2710 (which may be optional), in accordance with the teachings of the embodiments described throughout this disclosure, the base station receives user data from the UE. In step 2720 (which may be optional), the base station initiates transmission of the received user data to the host computer. In step 2730 (which may be optional), the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The present disclosure further includes the following embodiments.

The link or radio link over which the signals are transmitted between at least two UEs for D2D operation is called herein as the side link (SL). The signals transmitted between the UEs for D2D operation are called herein as SL signals. The term SL may also interchangeably be called as D2D link, V2X link, prose link, peer-to-peer link, PC5 link etc. The SL signals may also interchangeably be called as V2X signals, D2D signals, prose signals, PC5 signals, peer-to-peer signals etc.

In the below embodiments, the wording "at least one of" is used in the description of signaling alternatives between two nodes (i.e., between two UEs, or between a gNB and a UE). This wording means that a node may transmit the signaling information to another node using one or more than one alternatives. For the latter case, the node applies several different signaling alternatives to transmit the same information to the other node to improve the transmission reliability.

The methods and solution disclosed in the following, are referring to the NR Radio Access Technology (RAT) but can be applied also to LTE RAT and any other RAT enabling the transmission on two nearby devices without any loss of meaning.

Further, in the following we refer "TX UE" to as the UE that has data/traffic to transmit and establish and sidelink connection with a peer UE. Here, the peer UE is the UE that receive the data/traffic from the TX UE and hereafter is called as "RX UE".

Solutions on how to handle race conditions (e.g., for a UE pair, both UEs initiates the link establishment/RB setup in parallel, or in a very closing time interval) are proposed. For the race conditions, without specific solutions, both UEs would not be able to achieve alignment between DRX configurations (especially for the same service type).

In the solutions, the UE will either delay the procedure until the parallel procedure has been finished, or simply treat the parallel procedures as a failure case. So that the peer UE will restart the procedure after a while. Alternatively, there are rules or criteria defined/configured, so the UE pair knows which UE in the pair shall first start the procedure, another UE can start the procedure after the first procedure has completed.

The below embodiments are applicable to UEs with SL unicast.

Embodiments

In the first embodiment, for a sidelink UE pair (i.e., UE1 and UE2), one of the UEs (e.g., UE1) first initiates a sidelink unicast establishment or SLRB setup procedure for one direction (e.g., from UE1 to UE2), where UE1 sends a first PC5-RRC signaling/message (i.e., RRCReconfiguration-Sidelink) to UE2, which contains at least a SL DRX configuration (e.g., DRX configuration 1) to be applied (e.g., on the link regardless of directions, or on this given direction). While waiting for response message from UE2 (i.e., the message in response to the first message sent by UE1), UE1 has received a second PC5-RRC signaling (i.e., RRCRecon-figurationSidelink) message from UE2 for establishing a sidelink unicast connection or SL RB for the reverse direction (i.e., from UE2 to UE1). This second message also contains a SL DRX configuration (e.g., DRX configuration 2) to be applied (e.g., on the link regardless of directions, or on this given direction). If both signaling message are intended for the same service, UE1 may apply one of the below options to respond to the second message.

Option 1: UE1 delays the response for the message received from the UE2 until a response of the first message (i.e., sent to the UE2) has been provided by UE2. In this case, UE1 processes the response of the first message which may contain update to DRX configuration 1. Then, UE1 may adopt the update for DRX configuration 1. UE1 sends the response message of the second message to UE2. The response message may contain suggested changes (according to DRX configuration 1) to DRX configuration 2.

Option 2: UE1 delays the response for a configured time. A timer may be defined accordingly. The time value is configured by gNB or another controlling UE. Alternatively, the timer value is preconfigured. The timer is started upon reception of the first message. While the timer is running, if UE1 receives the response of the first message, the timer is stopped. When the timer is expired or stopped, UE1 sends the response message of the second message to UE2 which may contain suggested changes (according to DRX configu-ration 1) to DRX configuration 2. DRX configuration 1 may be updated based on the response of the first message if the response message has been received. It is worth noticing that since this timer may be configured at both UE1 and UE2, in order to avoid further race conditions, the value/duration of the timer should be different for UE1 and UE2 (if configured on both UEs).

Option 3: Without delaying, UE1 sends the response message to UE2 as if UE1 has not sent the first message to UE2. In this case, the response message (i.e., sent from UE1 to UE2) may contain positive acknowledgement or failure information (e.g., regarding whether DRX configuration 2 is applicable from UE1 perspective or not). Optionally, UE1 includes contain suggested changes (according to DRX configuration 1) to DRX configuration 2 into the response message so that UE2 is aware of the DRX configuration 1 and, eventually, what are the differences compared to DRX configuration 2.

Option 4: Without delaying, UE1 sends a failure response (e.g., RRCReconfigurationFailureSidelink) to UE2. In this case, UE1 treats the race condition as a failure case. The link or RB from UE2 to UE1 will not be established. UE2 can resend the signaling to establish the link or RB later (e.g., after the link or RB from UE1 to UE2 has been established). Alternatively, UE1 includes a failure cause in the response message indicating that the failure is due to a race condition or DRX misalignment (e.g., race conditions or DRX mis-alignment failure cause may be captured in the spec). Alternatively, UE1 also includes an expected time when UE2 may consider to resend the signaling to establish the link or RB from UE2 to UE1.

Note 1: for any one of the above options (especially Option 2 or Option 3), an additional negotiation process may be initiated after the establishment of RBs/links between UE1 and UE2 for further negotiating how to align SL DRX configuration(s).

Note 2: once UE1 and UE2 are aware of what are the DRX configuration 1 and DRX configuration 2, UE1 and UE2 may merge both configurations into one (e.g., DRX configuration 3) and apply it. For instance, the UEs can simply sum the on-duration time from DRX configuration 1 and DRX configuration 2 and so also other DRX parameters. In the sum, the overlapped period needs to be excluded. In an example, if DRX configuration 1 has on-duration timer with 10 ms, and DRX configuration 2 has on-duration timer with 20 ms, both timers have 10 ms overlap period, after merging, the timer would have the summed period 20 ms.

In the second embodiment, the UE (e.g., UE1 or UE2 in the UE pair) does not initiate the sidelink link establishment or the SLRB setup procedure right away when the traffic/data are available for transmission. Instead, the triggering or the first message to the peer UE is delayed by a time "X". In this case, "X" may be a random variable that follow a certain distribution chosen by the UE (e.g., normal, uniform, Cauchy, exponential, lognormal, and so on). By doing this, the probability that UE1 and UE2 sends a first signaling message at the same time is greatly reduced or almost none. However, it is worth to clarify that this approach may be used for application or services that are not delay sensitive or that has a large packet delay budget (PDB).

In the third embodiment, for the UE pair, at least one of the UE has network coverage. In this case, the network node (e.g., SMF, PCF or gNB) determines which UE (e.g., UE1) shall first initiate a link or RB establishment for a bidirec-tional service. Another UE (UE2) shall not establish the link or RB for the reverse link until UE1 has finished the link/RB establishment.

In the fourth embodiment, for the UE pair without net-work coverage. The UE pair applies at least one of the below options to decide which UE shall first initiate a link or RB establishment for a bidirectional service.

Option 1: include a time stamp in the signaling for link or RB establishment, indicating the time when the message was transmitted/triggered/generated. Based on the time stamp, UE processes the signaling message which is earliest transmitted. The other messages are processed later. If there are multiple messages transmitted or received at a same time, the UE can do a random selection on which message shall be processed first.

Option 2: include a decision weight in the signaling for link or RB establishment indicating how the message shall be prioritized in a race condition. In other words, the message with higher weight shall be processed earlier than the ones with lower weight. If there are multiple messages transmitted or received with a same weight, the UE can do a random selection on which message shall be processed first. The weight may be a fixed value configured/preconfigured to the UE. In an example, the weight could be UE ID (L2 ID or an application ID). The weight may be also determined based on at least one of the following inputs such as UE category (e.g., power saving may be more important to public safety terminal than other types of commercial terminals, in this case, the public safety terminal can be assigned with higher weight than other types of terminals), UE capabilities (e.g., a terminal supporting more features e.g., MIMO is assigned with higher weight than another terminal support fewer features e.g., without MIMO).

battery life (e.g., a terminal with lower battery life is assigned with higher weight than another terminal with higher battery life)

types of services which are being employed (e.g., public safety, V2X service etc, A UE with public safety service may be assigned with higher weight than another UE with V2X service in terms of power saving).

priority of services which are being employed (e.g., priority of a service may be determined depending on power saving requirements. A service with higher battery saving requirement (e.g., public safety) may be grant with higher priority in terms of power saving than another service with lower battery saving requirement (e.g., V2X).)

QoS requirements of services which are being employed (e.g., a service with higher battery saving requirement (e.g., public safety) may be grant with higher priority in terms of power saving than another service with lower battery saving requirement (e.g., V2X).)

Option 3: Certain rules are configured or preconfigured to the UE. Based on the rules, the UE can determine which message shall be processed first in case there are multiple messages transmitted or received in parallel or in a closing time window. The rules could contain at least one of the following UE category
UE capabilities
battery life
types of services which are being employed
priority of services which are being employed
QoS requirements of services which are being employed
Geographical location of the UEs In this embodiment, similar examples as the ones in Option 2 of the fourth embodiments are also applicable here when determining which message initiated by a UE shall be processed first in case there are multiple messages transmitted or received in parallel or in a closing time window. In another example, UEs located in an emergency area may need long battery life than UEs in an area without emergency situation. Therefore, a message initiated by a UE located in an emergency area needs to be processed first than any other messages.

In the fifth embodiment, for the first and the third embodiment, which option is adopted may be configured by the network (e.g., SMF, PCF or gNB) or a controlling UE. Alternatively, which option is adopted is captured in the spec in a hard coded fashion. Alternatively, which option is adopted is preconfigured to the UE.

In the sixth embodiment, for the DRX configurations serving the same service or application, in order to achieve alignment between the DRX configurations, the DRX parameters that are separately configured for each DRX configuration may contain at least one of the following drx-onDurationTimer
drx-InactivityTimer The rest DRX parameters are common to the DRX configurations. These DRX parameters may contain for example, drx-SlotOffset, drx-RetransmissionTimer, drx-LongCycleStartOffset, drx-ShortCycle (optional), drx-ShortCycleTimer (optional), drx-HARQ-RTT-Timer.

Note: the above DRX parameters are not restricted by the names. Any similar names are equally applicable without any loss of meaning.

In the seventh embodiment, the fifth embodiment is also applicable to DRX configurations configured for the same UE pair regardless of service types. In other words, alignment of all these DRX configurations can be also achieved similarly.

In the eighth embodiment, for any of the above embodiment, the signaling alternatives described will include at least one of the below:

For signaling between UE and the CN entity (e.g., SMF or PCF)

NAS RRC signaling
For signaling between UE and the gNB
RRC signaling
MAC CE
L1 signaling such as PRACH, PUCCH, PDCCH
For signaling between UEs
RRC signaling (e.g., PC5-RRC)
PC5-S signaling
Discovery signaling
MAC CE
L1 signaling such as SCI.

With the methods and solutions disclosed in the present disclosure, the latency, power consumption and signaling overhead reduced.

Active time on the SL is aligned between a TX UE and a RX UE. In this way, data loss due to active time misalignment is minimized.

A good tradeoff between UE power consumption and the performance of SL transmissions is achieved.

The invention claimed is:

1. A method in a first terminal device, comprising:

transmitting, to a second terminal device, a first sidelink message containing a first Discontinuous Reception (DRX) configuration;

receiving, from the second terminal device, a second sidelink message containing a second DRX configuration; and delaying transmission of a second response to the second sidelink message to the second terminal device until a first response to the first sidelink message is received from the second terminal device, or until a timer expires.

2. The method of claim 1, wherein the first response contains a suggested change to the first DRX configuration, and the method further comprises:

updating the first DRX configuration based on the suggested change to the first DRX configuration.

3. The method of claim 2, wherein the updated first DRX configuration and the second DRX configuration contain respective on-duration timers and/or inactivity timers that are configured separately, and one or more DRX parameters that are configured to be common to the updated first DRX configuration and the second DRX configuration.

4. The method of claim 3, wherein the one or more DRX parameters comprise a slot offset, a retransmission timer, a long cycle start offset, a short cycle, a short cycle timer, and/or a Hybrid Automatic Repeat reQuest Round-Trip Time timer.

5. The method of claim 2, further comprising:

transmitting the second response to the second terminal device, the second response containing a suggested change to the second DRX configuration.

6. The method of claim 5, wherein the suggested change to the second DRX configuration is determined based on the updated first DRX configuration.

7. The method of claim 1, wherein the timer is set to a different value from a corresponding timer provided at the second terminal device.

8. The method of claim 1, wherein each of the first DRX configuration and the second DRX configuration is for a bidirectional link between the first terminal device and the second terminal device, or the first DRX configuration is for a unidirectional link from the first terminal device to the second terminal device, and the second DRX configuration is for a unidirectional link from the second terminal device to the first terminal device.

9. The method of claim 1, wherein the first sidelink message is for sidelink unicast establishment or Sidelink Radio Bearer (SLRB) setup for a unidirectional link from the first terminal device to the second terminal device, and the second sidelink message is for sidelink unicast establishment or SLRB setup for a unidirectional link from the second terminal device to the first terminal device.

10. The method of claim 1, wherein the first sidelink message and the second sidelink message are associated with a same type of service or with different types of services.

11. The method of claim 1, further comprising:

receiving, from a network node or another terminal device controlling the first terminal device and/or the second terminal device, a configuration for the delaying.

12. The method of claim 11, wherein the network node is a next generation Node B, a Session Management Function node, or a Policy Control Function node.

13. The method of claim 12, wherein the configuration is received from the gNB via:

Radio Resource Control (RRC) signaling,

Medium Access Control (MAC) Control Element (CE), or

Layer 1 (L1) signaling;

the configuration is received from the SMF node or the PCF node via:

Non-Access Stratum (NAS) RRC signaling; or the configuration is received from the other terminal device via:

PC5-RRC signaling,

PC5-Signaling, discovery signaling,

MAC CE, or

L1 signaling.

14. A first terminal device, comprising a transceiver, a processor and a memory, the memory comprising instructions executable by the processor wherein the first terminal device is operative to:

transmit, to a second terminal device, a first sidelink message containing a first Discontinuous Reception (DRX) configuration;

receive, from the second terminal device, a second sidelink message containing a second DRX configuration; and delay transmission of a second response to the second sidelink message to the second terminal device until a first response to the first sidelink message is received from the second terminal device, or until a timer expires.

15. A method in a first terminal device, comprising:

transmitting, to a second terminal device, a first sidelink message for sidelink unicast establishment or Sidelink Radio Bearer (SLRB) setup for a unidirectional link from the first terminal device to the second terminal device;

receiving, from the second terminal device, a second sidelink message for sidelink unicast establishment or SLRB setup for a unidirectional link from the second terminal device to the first terminal device; and determining which of the first sidelink message and the second sidelink message is to be prioritized.

16. The method of claim 15, wherein the first sidelink message contains a first timestamp and the second sidelink message contains a second timestamp, and wherein said determining comprises determining to prioritize the first sidelink message when the first timestamp is earlier than the second timestamp, or to prioritize the second sidelink message when the second timestamp is earlier than the first timestamp.

17. The method of claim 15, wherein said determining comprises determining to prioritize the first sidelink message or the second sidelink message based on a first weight or priority associated with the first terminal device and a second weight or priority associated with the second terminal device.

18. The method of claim 17, wherein the first weight or priority is a first fixed value configured for the first terminal device, and the second weight or priority is a second fixed value configured for the second terminal device.

19. The method of claim 18, wherein the first fixed value is a User Equipment, UE, ID of the first terminal device, and the second fixed value is a UE ID of the second terminal device.

20. The method of claim 17, wherein the first weight or priority or the second weight or priority is dependent on one or more of the following associated with the first or second terminal device:

a User Equipment (UE) category, a UE capability, a battery life, a type of a current service, a priority of the current service, a Quality of Service (QoS) requirement for the current service, or a geographical location.

* * * * *